United States Patent
Barker et al.

(10) Patent No.: US 10,399,863 B2
(45) Date of Patent: *Sep. 3, 2019

(54) DOPED NICKELATE MATERIALS

(71) Applicant: FARADION LIMITED, Sheffield, South Yorkshire (GB)

(72) Inventors: Jeremy Barker, Chipping Norton (GB); Richard Heap, Abingdon (GB)

(73) Assignee: FARADION LIMITED, Sheffield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/313,201

(22) PCT Filed: May 21, 2015

(86) PCT No.: PCT/GB2015/051495
§ 371 (c)(1),
(2) Date: Nov. 22, 2016

(87) PCT Pub. No.: WO2015/177556
PCT Pub. Date: Nov. 26, 2015

(65) Prior Publication Data
US 2017/0174527 A1    Jun. 22, 2017

(30) Foreign Application Priority Data

May 22, 2014 (GB) .................................. 1409163.1
Nov. 27, 2014 (GB) .................................. 1421105.6

(51) Int. Cl.
*G02F 1/155* (2006.01)
*C01G 53/00* (2006.01)
(Continued)

(52) U.S. Cl.
CPC ............. *C01G 53/40* (2013.01); *C01G 53/50* (2013.01); *C01G 53/66* (2013.01); *G02F 1/155* (2013.01);
(Continued)

(58) Field of Classification Search
CPC ........ C01G 53/00; H01M 4/525; H01M 4/505
(Continued)

(56) References Cited

U.S. PATENT DOCUMENTS

2004/0110063 A1   6/2004 Uchitomi et al.
2007/0218359 A1*  9/2007 Shimizu ................ H01M 4/505
                                                    429/223
(Continued)

FOREIGN PATENT DOCUMENTS

CN      1610152      4/2005
CN      101043093 A  9/2007
(Continued)

OTHER PUBLICATIONS

First Office Action and Search Report issued in connection with Chinese Application No. 201580025425.0, dated Jun. 26, 2017, 9 pages.
(Continued)

*Primary Examiner* — Khanh T Nguyen
(74) *Attorney, Agent, or Firm* — Meunier Carlin & Curfman LLC

(57) ABSTRACT

The invention relates to doped nickelate-containing material with the general formula: $A_a\, M^1_v\, M^2_w\, M^3_x\, M^4_y\, M^5_z\, O_{2-\delta}$ wherein A comprises one or more alkali metals selected from sodium, lithium and potassium; $M^1$ is nickel in oxidation state 2+, $M^2$ comprises one or more metals in oxidation state 4+, $M^3$ comprises one or more metals in oxidation state 2+, $M^4$ comprises one or more metals in oxidation state 4+, and $M^5$ comprises one or more metals in oxidation state 3+ wherein $0.4 \leq a < 0.9$, $0 < v < 0.5$, at least one of w and y is $>0$, $x>0$, $z \geq 0$, $0 \leq \delta \leq 0.1$, and wherein a, v, w, x, y and z are chosen to maintain electroneutrality.

10 Claims, 22 Drawing Sheets

(51) Int. Cl.
H01M 4/131 (2010.01)
H01M 4/505 (2010.01)
H01M 4/525 (2010.01)
H01M 10/0525 (2010.01)
H01M 10/054 (2010.01)
H01M 10/052 (2010.01)

(52) U.S. Cl.
CPC ............ *H01M 4/131* (2013.01); *H01M 4/505* (2013.01); *H01M 4/525* (2013.01); *H01M 10/052* (2013.01); *H01M 10/054* (2013.01); *H01M 10/0525* (2013.01); *C01P 2002/72* (2013.01); *C01P 2006/40* (2013.01)

(58) Field of Classification Search
USPC ........................................ 252/182.1; 429/223
See application file for complete search history.

(56) References Cited

U.S. PATENT DOCUMENTS

| | | | |
|---|---|---|---|
| 2007/0218361 A1 | 9/2007 | Inoue et al. | |
| 2007/0224506 A1 | 9/2007 | Ooyama et al. | |
| 2012/0183837 A1 | 7/2012 | Johnson et al. | |
| 2014/0131617 A1* | 5/2014 | Park ...................... | H01M 4/505 252/182.1 |

FOREIGN PATENT DOCUMENTS

| | | |
|---|---|---|
| CN | 102341941 | 2/2012 |
| GB | 2503896 A | 1/2014 |
| GB | 2506859 A | 4/2014 |
| JP | 2003242976 | 8/2003 |
| JP | 2012206925 A | 10/2012 |
| JP | 2014160653 A | 9/2014 |
| JP | 2015176678 A | 10/2015 |
| WO | 2011129419 A1 | 10/2011 |
| WO | 2013140174 | 9/2013 |
| WO | 2014009710 A1 | 1/2014 |
| WO | 2014009722 A1 | 1/2014 |
| WO | 2014009723 A1 | 1/2014 |
| WO | 2014009724 A1 | 1/2014 |
| WO | 2014057258 A1 | 4/2014 |
| WO | 2014077663 A1 | 5/2014 |

OTHER PUBLICATIONS

Buchholz, D., Chagas, L. G., Winter, M., & Passerini, S. (2013). P2-type layered Na0.45Ni0.22Co0.11Mn0.66O2 as intercalation host material for lithium and sodium batteries. Electrochimica Acta, 110, 208-213.

Chagas, L. G., Buchholz, D., Wu, L., Vortmann, B., & Passerini, S. (2014). Unexpected performance of layered sodium-ion cathode material in ionic liquid-based electrolyte. Journal of Power Sources, 247, 377-383.

Delmas, C., Fouassier, C., & Hagenmuller, P. (1980). Structural classification and properties of the layered oxides. Physica B+ C, 99(1), 81-85.

International Preliminary Report on Patentability of the International Preliminary Examining Authority, Application No. PCT/GB2015/051495, May 2, 2016, 5 pages.

International Search Report and Written Opinion of the International Searching Authority, Application No. PCT/GB2015/051495, dated Jul. 17, 2015, 9 pages.

Kim, D. et al. (2011). Enabling Sodium Batteries Using Lithium-Substituted Sodium Layered Transition Metal Oxide cathodes. Advanced Energy Materials, 1(3), 333-336.

Lee, D. H., Xu, J., & Meng, Y. S. (2013). An advanced cathode for Na-ion batteries with high rate and excellent structural stability. Physical Chemistry Chemical Physics, 15(9), 3304-3312.

Lu, Z., & Dahn, J. R. (2001). Can All the Lithium be Removed from T2Li2/3[Ni1/3Mn2/3]O2?. Journal of The Electrochemical Society, 148(7), A710-A715.

Pollet, M., Blangero, M., Doumerc, J. P., Decourt, R., Carlier, D., Denage, C., & Delmas, C. (2009). Structure and properties of alkali cobalt double oxides A0.6CoO2 (A=Li, Na, and K). Inorganic chemistry, 48(20), 9671-9683.

Search Report of the GB Intellectual Property Office, Application No. GB1409163.1, Nov. 25, 2014, 5 pages.

Search Report of the GB Intellectual Property Office—Amended, Application No. GB1409163.1, dated Dec. 2, 2014, 3 pages.

Search Report of the GB Intellectual Property Office, Application No. GB1421105.6, dated May 26, 2015, 4 pages.

Shin, Y. J., & Yi, M. Y. (2000). Preparation and structural properties of layer-type oxides NaxNix/2Ti1-x/2O2 (0.60≤ x≤ 1.0). Solid State Ionics, 132(1), 131-141.

Smirnova, O. A., Avdeev, M., Nalbandyan, V. B., Kharton, V. V., & Marques, F. M. B. (2006). First observation of the reversible O3↔P2 phase transition: Crystal structure of the quenched high-temperature phase Na0.74Ni0.58Sb0.42O2. Materials Research Bulletin, 41(6), 1056-1062.

Tournadre, F., Croguennec, L., Saadoune, I., Culler, D., Shao-Horn, Y., Willmann, P., & Delmas, C. (2004). On the mechanism of the P2—Na0.70CoO2→O2—LiCoO2 exchange reaction—Part I: proposition of a model to describe the P2—O2 transition. Journal of Solid State Chemistry, 177(8), 2790-2802.

Wang, H., Yang, B., Liao, X. Z., Xu, J., Yang, D., He, Y. S., & Ma, Z. F. (2013). Electrochemical properties of P2—Na 2/3[Ni1/3Mn2/3]O2 cathode material for sodium ion batteries when cycled in different voltage ranges. Electrochimica Acta, 113, 200-204.

Yuan, D. et al. (2014). P2-type Na0.67Mn0.65Fe0.2Ni0.15O2 cathode material with high-capacity for sodium-ion battery. Electrochimica Acta, 116, 300-305.

International Preliminary Report on Patentability of the International Preliminary Examining Authority, Application No. PCT/GB2015/051482, dated Jul. 19, 2016, 6 pages.

International Search Report and Written Opinion of the International Searching Authority, Application No. PCT/GB2015/051482, dated Jul. 24, 2015, 11 pages.

Kim et al. 2014. Approaching the Theoretical Capacities of LiMnBO3. Abstract of presentation given at 17th international Meeting on Lithium Batteries, Jun. 10-14, 2014. Como, Italy.

Yabuuchi, N. et al. (2012). P2-type Nax [Fe1/2Mn1/2] O2 made from earth-abundant elements for rechargeable Na batteries. Nature materials, 11(6), 512-517.

Lei, Y. et al. (2014). Synthesis and Stoichiometry of Different Layered Sodium Cobalt Oxides. Chemistry of Materials, 26, 5288-5296.

Han, M.H. et al. (2015). A comprehensive review of sodium layered oxides: powerful cathodes for Na-ion batteries. Energy Environ. Sci., 8, 81-102.

First Office Action issued in connection with Chinese Application No. 201580026390.2, dated Jun. 23, 2017, with English translation attached.

First Office Action and Search Report issued in connection with Chinese Application No. 201580004079.8, dated Feb. 20, 2017, with English translation attached.

International Search Report and Written Opinion issued by the International Searching Authority for Application No. PCT/GB2015/050023 dated May 8, 2015.

International Preliminary Report on Patentability issued by the International Preliminary Examining Authority for Application No. PCT/GB2015/050023 dated Jan. 28, 2016.

Search Report and Written Opinion of the GB Intellectual Property Office from Application No. GB1400347.9 dated Jul. 10, 2014.

Search Report and Written Opinion of the GB Intellectual Property Office from Application No. GB1400347.9 dated Feb. 9, 2015.

Gotoh, Kazuma, Toni Ishikawa, Saori Shimadzu, Naoaki Yabuuchi, Shinichi Komaba, Kazuyuki Takeda, Atsushi Goto et al. "NMR study for electrochemically inserted Na in hard carbon electrode of sodium ion battery." Journal of power sources 225 (2013): 137-140.

Komaba, S., Ishikawa, T., Yabuuchi, N., Murata, W., Ito, A., & Ohsawa, Y. (2011). "Fluorinated ethylene carbonate as electrolyte

(56) References Cited

OTHER PUBLICATIONS additive for rechargeable Na batteries." ACS applied materials & interfaces, 3(11) (2011), 4165-4168.

Komaba, Shinichi, Wataru Murata, Toni Ishikawa, Naoaki Yabuuchi, Tomoaki Ozeki, Tetsuri Nakayama, Atsushi Ogata, Kazuma Gotoh, and Kazuya Fujiwara. "Electrochemical Na insertion and solid electrolyte interphase for hard-carbon electrodes and application to Na-Ion batteries." Advanced Functional Materials 21 (2011): 3859-3867.

Komaba, Shinichi, Naoaki Yabuuchi, Tetsuri Nakayama, Atsushi Ogata, Toni Ishikawa, and Izumi Nakai. "Study on the Reversible Electrode Reaction of Na1—x Ni0. 5Mn0. 5O2 for a Rechargeable Sodium-Ion Battery." Inorganic chemistry 51, No. 11 (2012): 6211-6220.

Lu, Z., & Dahn, J. R. "Understanding the anomalous capacity of Li/Li [Ni x Li (1/3—2x/3) Mn (2/3—x/3)] O 2 cells using in situ X-ray diffraction and electrochemical studies." Journal of The Electrochemical Society, 149(7) (2002), A815-A822.

English Translation of Japanese Office Action issued in JP 2016-568408, dated Sep. 13, 2018.

Komaba et al., Structural and electrochemical behaviors of metastable Li2/3[Ni1/3Mn2/3]O2 modified by metal element substitution, Electrochimica Acta, Nov. 13, 2008, vol. 54, p. 2353-2359.

Zhao et al., a new route for the synthesis of Li2MnO3 based cathode material with enhanced first cycle efficiency and cycleability for lithium ion batteries, Journal of Power Sources, Mar. 26, 2014, vol. 261, p. 324-331.

\* cited by examiner

DOPED NICKELATE MATERIALS

FIELD OF THE INVENTION

The present invention relates to novel doped nickelate materials, to a process for making such doped nickelate materials, to electrodes containing such materials, to the use of such materials, for example in energy storage devices. In addition the present invention relates to a process of storing electrical charge using a device comprising such doped nickelate materials, and to rechargeable batteries comprising such materials.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

Metal oxides with the general formula $A_xMO_2$ (where A represents one or more alkali metal ions and M represents one or more metal ions at least one of which has several oxidation states, for example a transition metal) are known to crystallise in a number of different layered structures. This is described in detail by C. Delmas et al in "Structural Classification and Properties of the Layered Oxides", Physica 99B (1980) 81-85. In summary, the structures are all made up of $MO_6$ edge sharing octahedra which form $(MO_2)_n$ sheets. These sheets are stacked one on top the other and are separated by the alkali metal atoms and the exact position of the alkali metal will dictate whether the overall structure of the metal oxide is to be described as octahedral (O), tetrahedral (T) or prismatic (P). In a lattice made up of hexagonal sheets, there are three possible positions for the oxygen atoms, conventionally named A, B and C. It is the order in which these sheets are packed together that leads to the O, T and P environments. The number 2 or 3 is also used to describe the number of alkali metal layers in the repeat unit perpendicular to the layering. For example, when the layers are packed in the order ABCABC, an O3 structure is obtained. This translates to 3 alkali metal layers in the repeat unit and each alkali metal being in an octahedral environment. Such materials are characterised by the alkali metal ions being in octahedral orientation and typical compounds of this structure are $A_xMO_2$ ($x \leq 1$). The order ABAB with the alkali metal ions in tetrahedral orientation will yield a T1 structure which is typified by $A_2MO_2$ compounds. Packing the sheets in ABBA order gives a P2 structure in which one half of the prism shares edges with $MO_6$ octahedra and the other half shares faces and typical compounds are $A_{=0.7}MO_2$. And finally, packing in ABBCCA order results in a P3 structure type in which all prisms share one face with one $MO_6$ octahedron and three edges with three $MO_6$ octahedra of the next sheet. $A_{=0.5}MO_2$ compounds are found to adopt the P3 structure. It will be noted that the amount of alkali metal present in the $A_xMO_2$ material has a direct bearing on the overall structure of the metal oxide.

Over the last ten years, numerous workers have investigated the electrochemical properties of single phase metal oxides with a P2 structure. For example C. Delmas et al report the phase transformations and electrochemical behaviour of P2-$Na_xCoO_2$, see for example J. Solid State Chem., 2004, 177, 2790-2802 and Inorg. Chem., 2009, 48, 9671-9683. Further, Lu and Dahn, J. Electrochem. Soc., 2001, 148, A710-715, demonstrate that the P2-layered oxide $Na_{2/3}[Ni_{1/3}Mn_{2/3}]O_2$ can reversibly exchange Na-ions in sodium half cells however, these oxide compounds are expected to show poor cycling ability, especially between 2.3-4.5 V at C/100.

More recently, Kim et al Adv. Energy Mater., 2011, 1, 333-336 reported that the presence of lithium in single phase P2 lithium substituted compounds such as $Na_{1.0}Li_{0.2}Ni_{0.25}Mn_{0.75}O_2$, provides some improvement in the structural stability during cycling, but the reversible capacity of these compounds is still too low due to the limited amount (25%) of redox active divalent Ni. And in another recent paper by Y. Shirley Meng and D. H. Lee, Phys. Chem. Chem. Phys., 2013, 15, 3304, P2-$Na_{2/3}[Ni_{1/3}Mn_{2/3}]O_2$ is reported to exhibit excellent cycling and a high rate capability, however these results are only achieved when the material is charged below 4.22V; above 4.22V, the charge capacity is not maintained during cycling due to the phase transformation from P2 to O2.

In conclusion, the metal oxides that are discussed above are hampered by poor cycling stability, especially across a wide range of charge voltages. As a consequence, the commercial application of these compounds in Na-ion cells is limited.

The current workers have developed novel compounds which are doped-nickelate-containing materials (hereafter referred to as Target Active Materials) that are capable of delivering specific capacity performance with little or no fading on cycling. Moreover ideally, the doped nickelate-containing materials of the present invention have been found to achieve these excellent results under voltage conditions that would typically result in the phase transformation from P2 to O2; this is a significant improvement over compounds described in the prior art. Thus the Target Active Materials of the present invention may be used to provide an electrode, preferably a positive electrode, which is able to be recharged multiple times without significant loss in charge capacity. In particular the Target Active Materials of the present invention will provide an energy storage device for example a battery for use in a sodium-ion cell or a sodium metal cell.

The present invention therefore provides doped nickelate-containing materials (Target Active Materials) with the general formula:

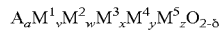

wherein
A comprises one or more alkali metals selected from sodium, lithium and potassium;
$M^1$ is nickel in oxidation state 2+;
$M^2$ comprises one or more metals in oxidation state 4+,
$M^3$ comprises one or more metals in oxidation state 2+,
$M^4$ comprises one or more metals in oxidation state 4+, and
$M^5$ comprises one or more metals in oxidation state 3+
wherein
$0.4 \leq a < 0.9$, preferably $0.5 \leq a < 0.85$, further preferably $0.6 \leq a \leq 0.75$,
$0 < v < 0.5$, preferably $0 < v \leq 0.45$ and ideally $0 < v \leq 0.333$,
at least one of w and y is $> 0$,
$x > 0$,
$z \geq 0$,
$0 \leq \delta \leq 0.1$,
and wherein a, v, w, x, y and z are chosen to maintain electroneutrality.
Preferably $\delta = 0$.
Preferred doped nickelate-containing materials (Target Active Materials) are of the general formula:

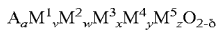

wherein
A comprises one or more alkali metals selected from sodium, lithium and potassium;
$M^1$ is nickel in oxidation state 2+,
$M^2$ comprises one or more metals in oxidation state 4+,
$M^3$ comprises one or more metals in oxidation state 2+,
$M^4$ comprises one or more metals in oxidation state 4+, and
$M^5$ comprises one or more metals in oxidation state 3+
wherein
$0.55 < a < 0.85$,
$0.25 < v \leq 0.333$,
at least one of w and y is $> 0$,
$x > 0$,
$z \geq 0$,
$0 \leq \delta \leq 0.1$,
and wherein a, v, w, x, y and z are chosen to maintain electroneutrality.
Preferably the alkali metal A is selected from either sodium or a mixed alkali metal in which sodium is the major constituent.
In particularly preferred Target Active Materials, $v+w+x+y+z=1$.
Preferred Target Active Materials include:
$Na_{0.67}Ni_{0.3}Mn_{0.6}Mg_{0.033}Ti_{0.067}O_2$,
$Na_{0.67}Ni_{0.267}Mn_{0.533}Mg_{0.0067}Ti_{0.133}O_2$,
$Na_{0.67}Ni_{0.283}Mn_{0.567}Mg_{0.05}Ti_{0.1}O_2$,
$Na_{0.67}Ni_{0.25}Mn_{0.667}Mg_{0.083}O_2$,
$Na_{0.7}Ni_{0.240}Mn_{0.533}Mg_{0.110}Ti_{0.117}O_2$
$Na_{0.6}Ni_{0.240}Mn_{0.533}Mg_{0.060}Ti_{0.167}O_2$
$Na_{0.67}Ni_{0.240}Mn_{0.533}Mg_{0.093}Ti_{0.133}O_2$
$Na_{0.55}Ni_{0.240}Mn_{0.533}Mg_{0.035}Ti_{0.192}O_2$
$Na_{0.67}Ni_{0.240}Mn_{0.533}Mg_{0.043}Ti_{0.083}Fe_{0.100}O_2$ and
$Na_{0.67}Ni_{0.240}Mn_{0.533}Mg_{0.043}Ti_{0.083}Al_{0.100}O_2$.

Metals $M^2$ and $M^4$ may be the same or different metal(s) in oxidation state 4+. Moreover $M^2$ and $M^4$ are interchangeable with each other. When $M^2 = M^4$, then the structure may be written either as:

$A_a M^1_V M^2_W M^3_X M^4_Y M^5_Z O_{2-\delta}$, or $A_a M^1_V M^2_{W+Y} M^3_X M^5_Z O_{2-\delta}$, or $A_a M^1_V M^3_X M^4_{Y+W} M^5_Z O_{2-\delta}$, and all of these forms of the equation are to be regarded as equivalent.

Preferably the doped nickelate-containing materials of the present invention (Target Active Materials) comprise sodium alone as the chosen alkali metal.

Also, in further preferred doped nickelate-containing Target Active Materials, $M^2$ comprises one or more metals in oxidation state 4+ selected from manganese, titanium and zirconium; $M^3$ comprises one or more metals in oxidation state 2+ selected from magnesium, calcium, copper, zinc and cobalt; $M^4$ comprises one or more metals in oxidation state 4+ selected from manganese, titanium and zirconium; and $M^5$ comprises one or more metals in oxidation state 3+ selected from aluminium, iron, cobalt, molybdenum, chromium, vanadium, scandium and yttrium.

Target Active Materials comprising a layered P2-type structure are particularly advantageous.

The Target Active Materials may be prepared by any known and/or convenient process. For example, one or more precursor materials for the Target Active Materials may be heated (for example in a furnace) in order to facilitate a solid state reaction process. Such a process may be conveniently performed in the presence of air, but it may also be performed under an inert atmosphere. Ideally, the one or more precursor materials for the Target Active Materials comprise one or more metals selected from A, $M^1$, $M^2$, $M^3$, $M^4$ and $M^5$, which are as defined above. Particularly preferably, these one or more metals are present in the precursor materials in a stoichiometric ratio that corresponds with the amounts of the respective one or more metals present in the Target Active Material.

The doped nickelate-containing materials (Target Active Materials) of the present invention are suitable for use in many different applications including sodium ion and/or lithium ion and/or potassium ion cells which may be widely used for example in energy storage devices, such as batteries, rechargeable batteries, electrochemical devices and electrochromic devices.

Advantageously, one or more Target Active Materials may be used in an electrode, preferably a positive electrode (cathode), and further preferably in conjunction with a counter electrode and one or more electrolyte materials. The electrolyte materials may be any conventional or known materials and may comprise either aqueous electrolyte(s) or non-aqueous electrolyte(s).

It is also possible to convert sodium-ion derivatives into mixed lithium-ion/sodium-ion materials using an ion exchange process.

Typical ways to achieve Na to Li-ion exchange include:
1. Mixing the sodium-ion material with a lithium-containing material e.g. $LiNO_3$, heating to above the melting point of $LiNO_3$ (264° C.), cooling and then washing to remove the excess $LiNO_3$ and side-reaction product
2. Treating the Na-ion material with an aqueous solution of lithium salts, for example 1M LiCl in water; and
3. Treating the Na-ion material with a non-aqueous solution of lithium salts, for example LiBr in one or more aliphatic alcohols such as hexanol, propanol etc.

BRIEF DESCRIPTION OF THE DRAWINGS

The present invention will now be described with reference to the following figures in which.

Figure 10A:
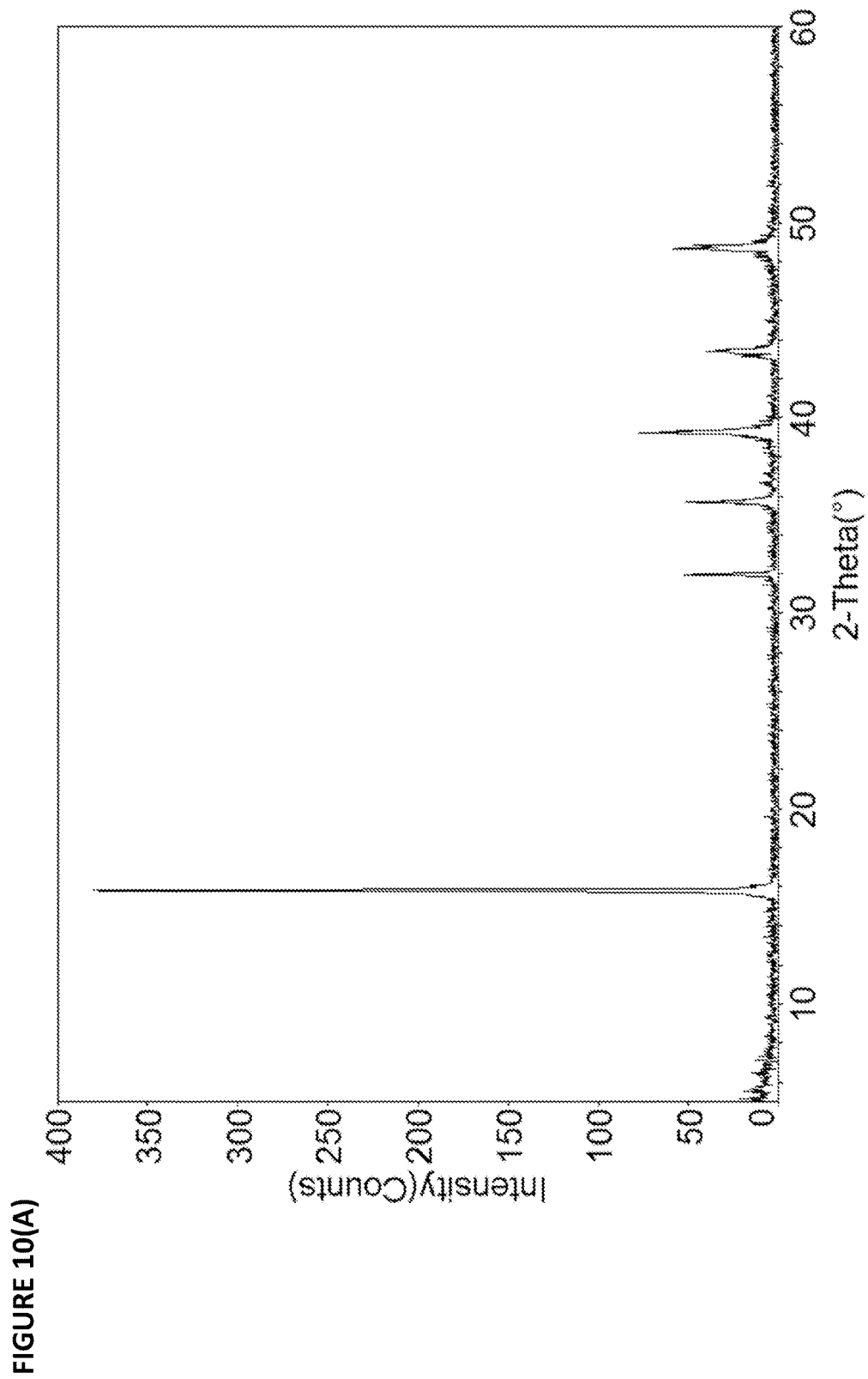
FIG. 10(A) is the XRD profile for the P2-Target Active Material of the present invention with the formula: P2-Na$_{0.67}$Ni$_{0.240}$Mn$_{0.533}$Mg$_{0.043}$Ti$_{0.083}$Fe$_{0.100}$O$_2$, as used in Example 10.
Figure 10B:
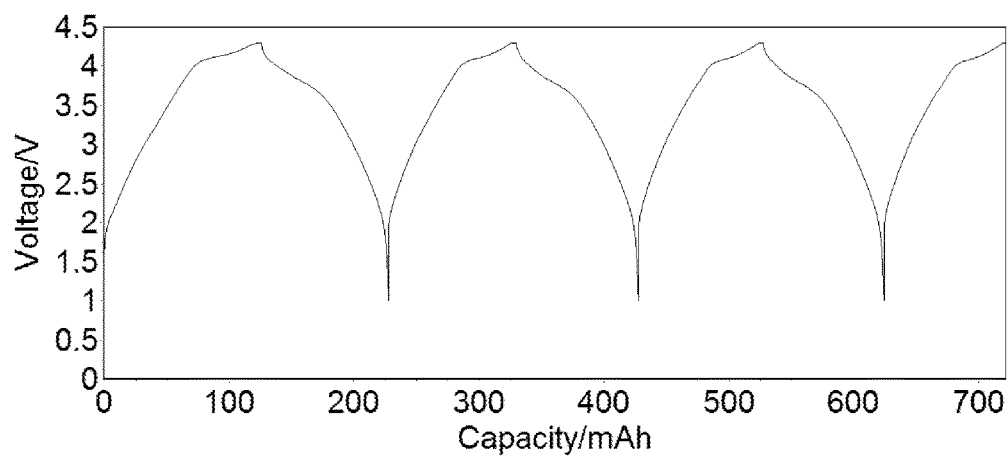
FIG. 10(B) shows the cell voltage profile (i.e. Na-ion Cell Voltage [V] versus Cumulative Cathode Specific Capacity
Figure 10C:
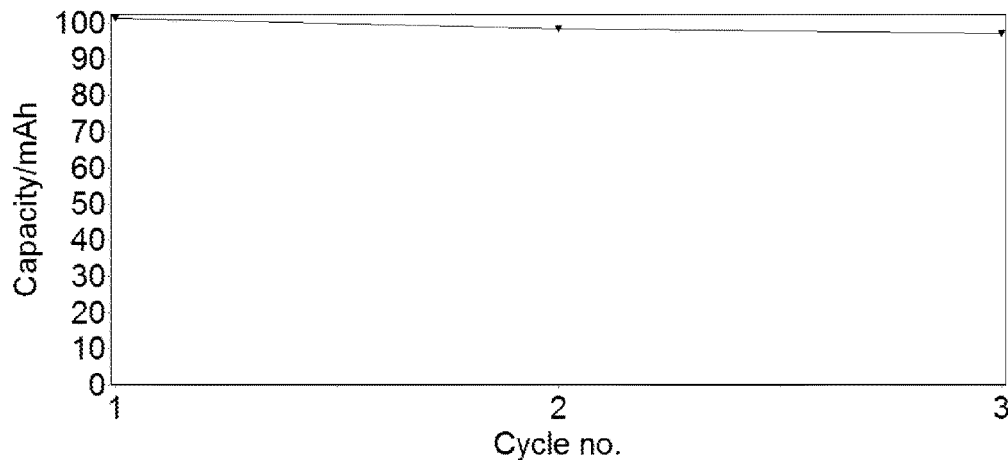
Figure 11A:
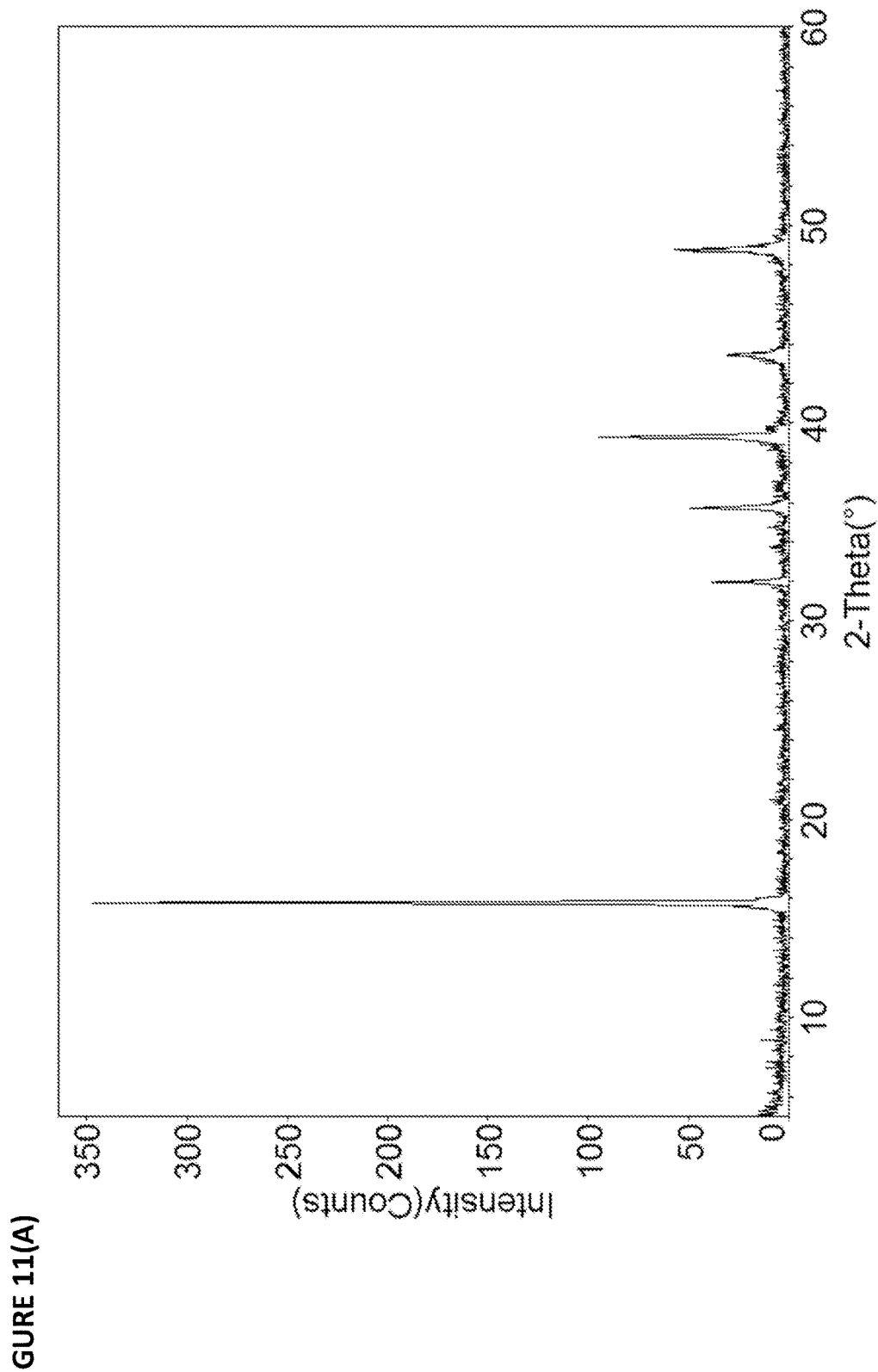
Figure 11B:
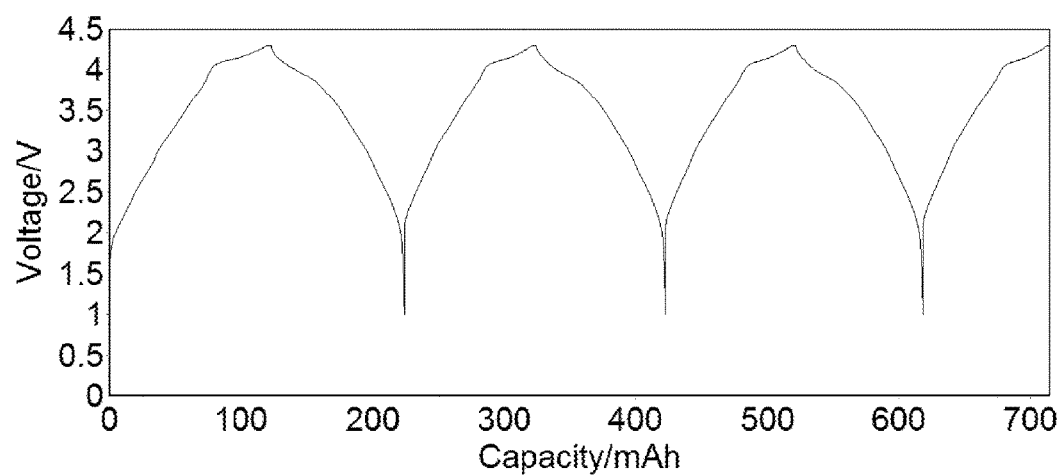
Figure 11C:
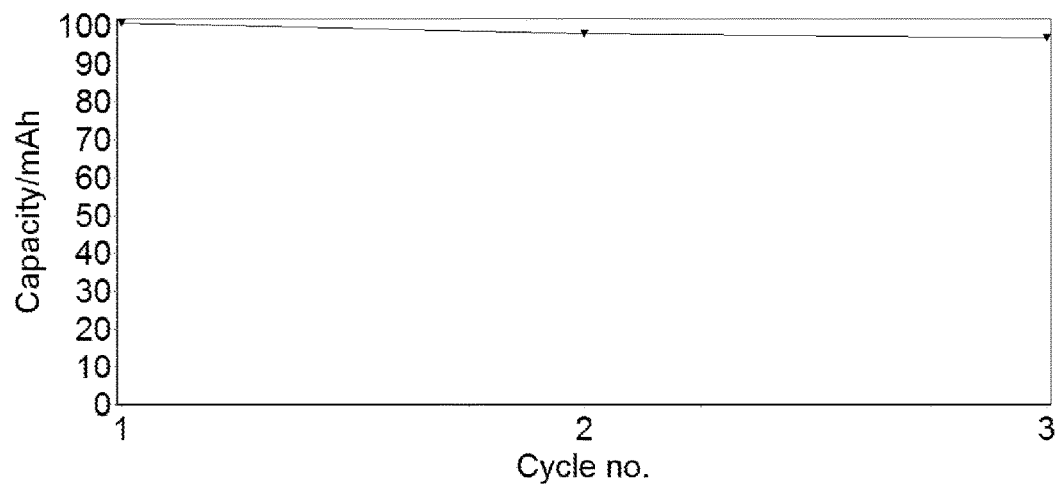

[mAh/g]) for the first 4 charge/discharge cycles of the Hard Carbon//P2-Na$_{0.67}$Ni$_{0.240}$Mn$_{0.533}$Mg$_{0.043}$Ti$_{0.083}$Fe$_{0.100}$O$_2$ cell;

FIG. 10(C) shows the Constant current cycle life profile (Cathode Specific Capacity for Discharge versus cycle number) for a full Na-ion Cell comprising hard carbon (Carbotron P(J) Kureha) and a Target Active Composition of the formula: P2-Na$_{0.67}$Ni$_{0.240}$Mn$_{0.533}$Mg$_{0.043}$Ti$_{0.083}$Fe$_{0.100}$O$_2$ in the voltage range 1.0-4.3V at 30° C. in 0.5M NaPF$_6$, in ethylene carbonate/diethyl carbonate/propylene carbonate;

FIG. 11(A) is the XRD profile for the P2-Target Active Material of the present invention with the formula: P2-Na$_{0.67}$Ni$_{0.240}$Mn$_{0.533}$Mg$_{0.043}$Ti$_{0.03}$Al$_{0.100}$O$_2$, as used in Example 11;

FIG. 11(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.240}$Mn$_{0.533}$Mg$_{0.043}$Ti$_{0.83}$Al$_{0.100}$O$_2$ cell;

FIG. 11(C) shows the Constant current cycle life profile (Cathode Specific Capacity for Discharge versus cycle number) for a full Na-ion Cell comprising hard carbon (Carbotron P(J) Kureha) and a P2-Target Active Composition of the present invention with the formula: P2-Na$_{0.67}$Ni$_{0.240}$Mn$_{0.533}$Mg$_{0.043}$Ti$_{0.083}$Al$_{0.100}$O$_2$ in the voltage range 1.0-4.3V at 30° C. in 0.5M NaPF$_6$, in ethylene carbonate/diethyl carbonate/propylene carbonate.

DETAILED DESCRIPTION

Any convenient process may be used to make the Target Active Materials of the present invention and a convenient chemical reaction may use the following general method:

General Method:
1) Intimately mix together the starting materials (i.e. the precursors for the Target Active Material) in the correct stoichiometric ratio for the particular Target Active Material, and press into a pellet;
2) Heat the resulting mixture in a furnace under a suitable atmosphere comprising for example ambient air, or an inert atmosphere (e.g. argon, nitrogen) (the gases may be flowing if desired), at a single temperature or over a range of temperatures between 400° C. and 1500° C. until reaction product forms; and optionally
3) Allow the product to cool before grinding it to a powder.

Table 1 below lists the starting materials and heating conditions used to prepare a known (comparative) composition (Example 1) and the Target Active Materials of the present invention (Examples 2 to 11).

TABLE 1

| Example No. (Sample No.) | Target Composition | Starting Materials | Furnace Conditions |
|---|---|---|---|
| 1 (X1657) | P2-Na$_{0.67}$Ni$_{0.33}$Mn$_{0.67}$O$_2$ (Known material) | 0.333 Na$_2$CO$_3$<br>0.333 NiCO$_3$<br>0.667 MnO$_2$ | 900° C., air, 8 hours |
| 2 (X1659) | P2-Na$_{0.67}$Ni$_{0.3}$Mn$_{0.6}$Mg$_{0.033}$Ti$_{0.067}$O$_2$<br>General formula: Na$_{(2/3)}$Ni$_{(1/3)-x}$Mn$_{(2/3)-y}$Mg$_x$Ti$_y$O$_2$, where x = 1/30 and y = 1/15 | 0.333 Na$_2$CO$_3$<br>0.300 NiCO$_3$<br>0.600 MnO$_2$<br>0.033 Mg(OH)$_2$<br>0.067 TiO$_2$ | 900° C., air, 8 hours |
| 3 (X1663) | P2-Na$_{0.67}$Ni$_{0.267}$Mn$_{0.533}$Mg$_{0.067}$Ti$_{0.133}$O$_2$<br>General formula: Na$_{(2/3)}$Ni$_{(1/3)-x}$Mn$_{(2/3)-y}$Mg$_x$Ti$_y$O$_2$, where x = 1/15 and y = 2/15 | 0.333 Na$_2$CO$_3$<br>0.267 NiCO$_3$<br>0.533 MnO$_2$<br>0.067 Mg(OH)$_2$<br>0.133 TiO$_2$ | 900° C., air, 8 hours |
| 4 (X1684) | P2-Na$_{0.67}$Ni$_{0.25}$Mn$_{0.667}$Mg$_{0.083}$O$_2$<br>General formula: Na$_{(2/3)}$Ni$_{(1/3)-x}$Mn$_{(2/3)}$Mg$_x$O$_2$, where x = 1/12 | 0.333 Na$_2$CO$_3$<br>0.250 NiCO$_3$<br>0.667 MnO$_2$<br>0.083 Mg(OH)$_2$ | 900° C., air, 10 hours |
| 5 (X1713) | P2-Na$_{0.67}$Ni$_{0.283}$Mn$_{0.567}$Mg$_{0.05}$Ti$_{0.1}$O$_2$<br>General formula: Na$_{(2/3)}$Ni$_{(1/3)-x}$Mn$_{(2/3)-y}$Mg$_x$Ti$_y$O$_2$, where x = 1/20 and y = 1/10 | 0.333 Na$_2$CO$_3$<br>0.283 NiCO$_3$<br>0.567 MnO$_2$<br>0.050 Mg(OH)$_2$<br>0.100 TiO$_2$ | 900° C., air, 10 hours |
| 6 (X1919) | P2-Na$_{0.7}$Ni$_{0.240}$Mn$_{0.533}$Mg$_{0.110}$Ti$_{0.117}$O$_2$ | 0.350 Na$_2$CO$_3$<br>0.240 NiCO$_3$<br>0.533 MnO$_2$<br>0.110 Mg(OH)$_2$<br>0.117 TiO$_2$ | 900° C., air, 8 hours |
| 7 (X1921) | P2-Na$_{0.6}$Ni$_{0.240}$Mn$_{0.533}$Mg$_{0.060}$Ti$_{0.167}$O$_2$ | 0.300 Na$_2$CO$_3$<br>0.240 NiCO$_3$<br>0.533 MnO$_2$<br>0.060 Mg(OH)$_2$<br>0.167 TiO$_2$ | 900° C., air, 8 hours |
| 8 (X1922) | P2-Na$_{0.67}$Ni$_{0.240}$Mn$_{0.533}$Mg$_{0.093}$Ti$_{0.133}$O$_2$ | 0.333 Na$_2$CO$_3$<br>0.240 NiCO$_3$<br>0.533 MnO$_2$<br>0.093 Mg(OH)$_2$<br>0.133 TiO$_2$ | 900° C., air, 8 hours |
| 9 (X1923) | P2-Na$_{0.55}$Ni$_{0.240}$Mn$_{0.533}$Mg$_{0.035}$Ti$_{0.192}$O$_2$ | 0.275 Na$_2$CO$_3$<br>0.240 NiCO$_3$<br>0.533 MnO$_2$<br>0.035 Mg(OH)$_2$<br>0.192 TiO$_2$ | 900° C., air, 8 hours |

TABLE 1-continued

| Example No. (Sample No.) | Target Composition | Starting Materials | Furnace Conditions |
|---|---|---|---|
| 10 (X1926) | P2-$Na_{0.67}Ni_{0.240}Mn_{0.533}Mg_{0.043}Ti_{0.083}Fe_{0.100}O_2$ | 0.333 $Na_2CO_3$<br>0.240 $NiCO_3$<br>0.533 $MnO_2$<br>0.043 $Mg(OH)_2$<br>0.083 $TiO_2$<br>0.050 $Fe_2O_3$ | 900° C., air, 8 hours |
| 11 (X1927) | P2-$Na_{0.67}Ni_{0.240}Mn_{0.533}Mg_{0.043}Ti_{0.083}Al_{0.100}O_2$ | 0.333 $Na_2CO_3$<br>0.240 $NiCO_3$<br>0.533 $MnO_2$<br>0.043 $Mg(OH)_2$<br>0.083 $TiO_2$<br>0.100 $Al(OH)_3$ | 900° C., air, 8 hours |

Product Analysis Using XRD

Analysis by X-ray diffraction techniques was conducted using a Siemens D5000 powder diffractometer to confirm that the desired target materials had been prepared, to establish the phase purity of the product material and to determine the types of impurities present. From this information it is possible to determine the lattice parameters of the unit cells.

The general XRD operating conditions used to analyse the materials are as follows:
Slits sizes: 1 mm, 1 mm, 0.1 mm
Range: 2θ=5°-60°
X-ray Wavelength=1.5418 Å (Angstroms) (Cu Kα)
Speed: 1.0 seconds/step
Increment: 0.025°
Electrochemical Results The target materials were tested using a Na-ion test cell using a hard carbon anode. Cells may be made using the following procedures:

A Na-ion electrochemical test cell containing the active material is constructed as follows:
Generic Procedure to Make a Hard Carbon Na-Ion Cell The positive electrode is prepared by solvent-casting a slurry of the active material, conductive carbon, binder and solvent. The conductive carbon used is Super P (Timcal). PVdF is used as the binder, and N-Methyl-2-pyrrolidone (NMP) is employed as the solvent. The slurry is then cast onto aluminium foil and heated until most of the solvent evaporates and an electrode film is formed. The electrode is then dried under dynamic vacuum at about 120° C. The electrode film contains the following components, expressed in percent by weight: 88% active material, 6% Super P carbon, and 6% PVdF binder.

The negative electrode is prepared by solvent-casting a slurry of the hard carbon active material (Carbotron P/J, supplied by Kureha), conductive carbon, binder and solvent. The conductive carbon used is Super P (Timcal). PVdF is used as the binder, and N-Methyl-2-pyrrolidone (NMP) is employed as the solvent. The slurry is then cast onto aluminium foil and heated until most of the solvent evaporates and an electrode film is formed. The electrode is then dried further under dynamic vacuum at about 120° C. The electrode film contains the following components, expressed in percent by weight: 89% active material, 2% Super P carbon, and 9% PVdF binder.
Cell Testing The cells are tested as follows, using Constant Current Cycling techniques.

Figure 1A:
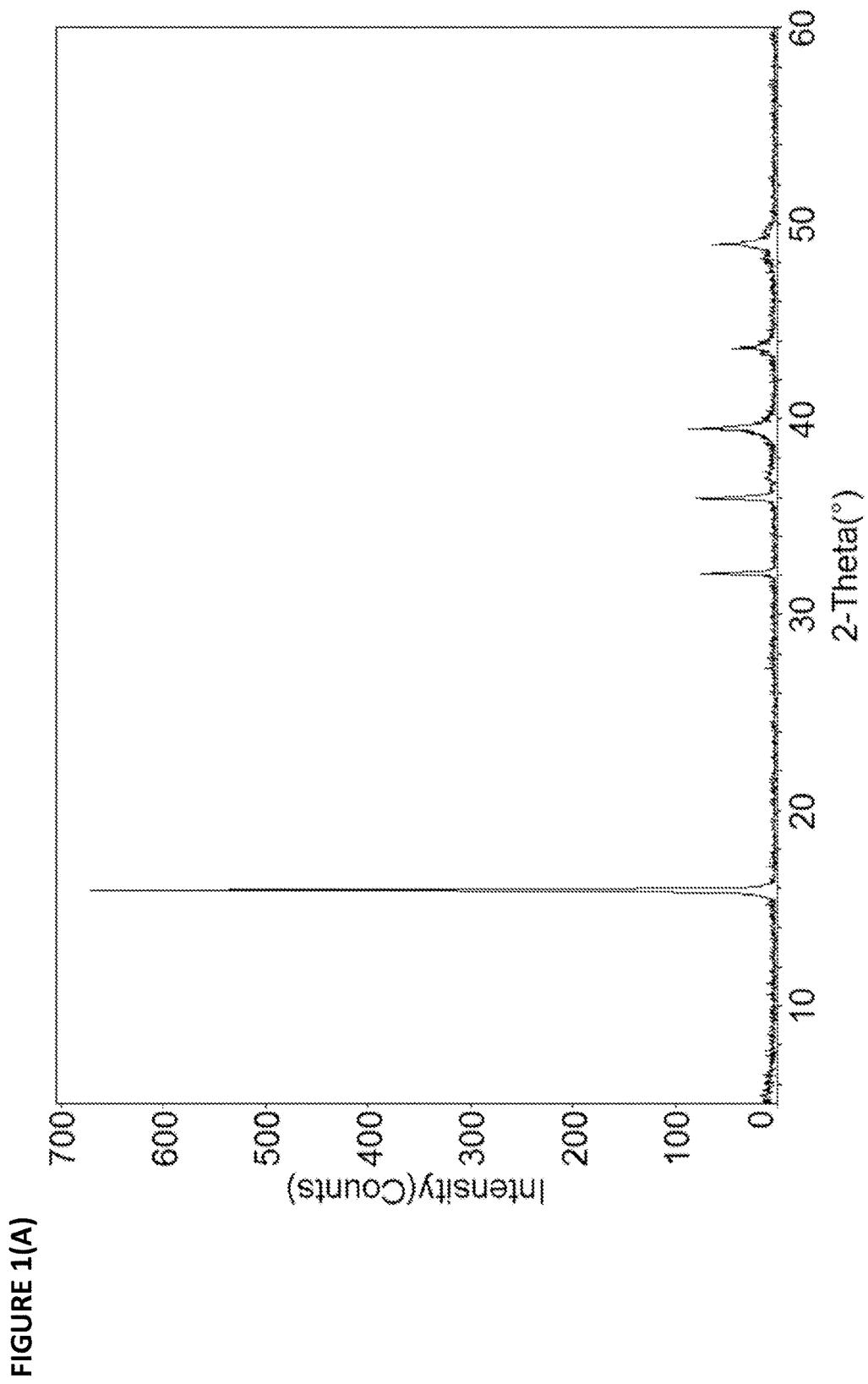
FIG. 1(A) is the XRD profile for the known compound P2-Na$_{0.67}$Ni$_{0.33}$Mn$_{0.67}$O$_2$ used in Example 1 (comparative example)
Figure 1B:
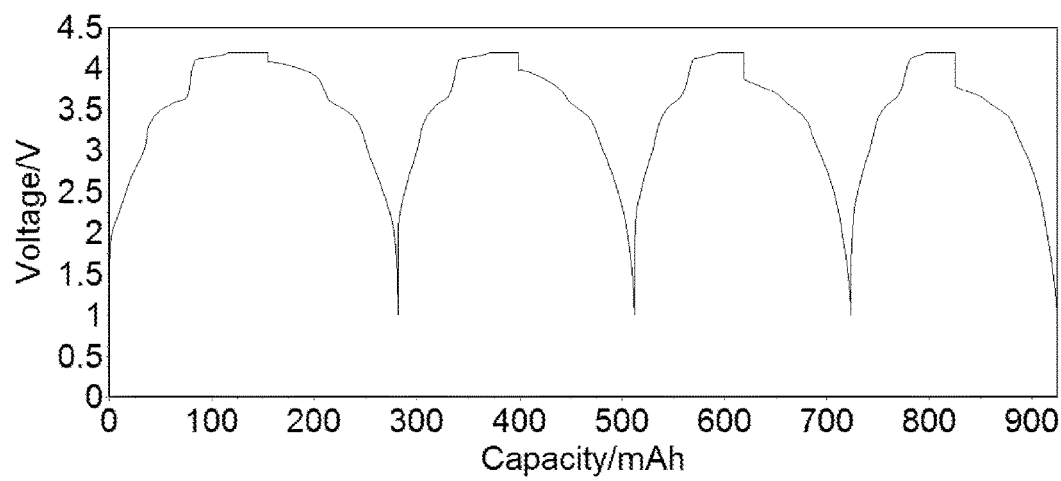
FIG. 1(B) shows the cell voltage profile (i.e. Na-ion Cell Voltage [V] versus Cumulative Cathode Specific Capacity [mAh/g]) for the first 4 charge/discharge cycles of the Hard Carbon//Na$_{0.67}$Ni$_{0.33}$Mn$_{0.67}$O$_2$ cell.
Figure 1C:
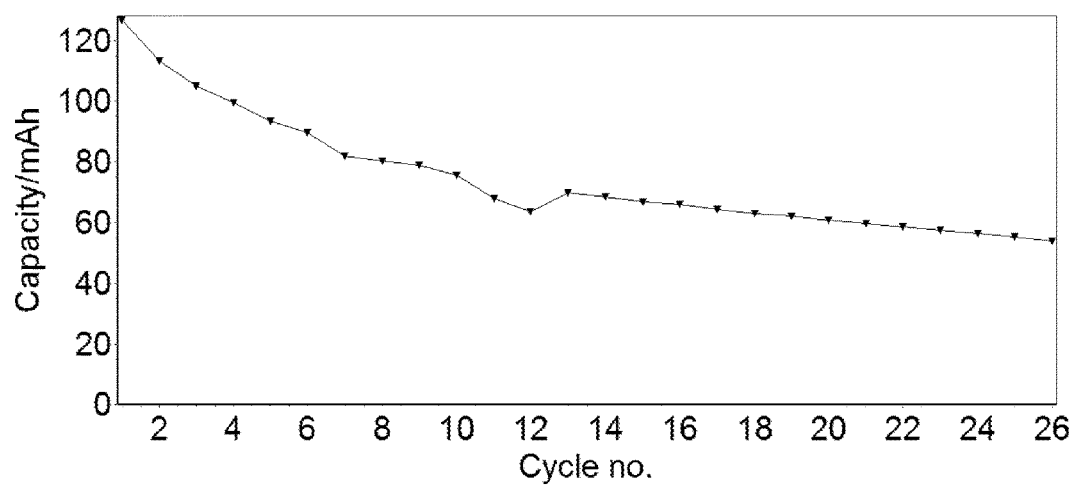
FIG. 1(C) shows the Constant current cycling (CC/CV) of full Na-ion Cell comprising hard carbon (Carbotron P(J) Kureha) and P2-Na$_{0.67}$Ni$_{0.33}$Mn$_{0.67}$O$_2$ in the voltage range 1.0-4.2V at 30° C. in 0.5M NaClO$_4$, with propylene carbonate (PC) and glass fibre filter paper (Whatman Grade GF/A) used as a separator.

The cell is cycled at a given current density between pre-set voltage limits. A commercial battery cycler from Maccor Inc. (Tulsa, Okla., USA) is used. On charge, alkali ions are extracted from the cathode active material. During discharge, alkali ions are re-inserted into the cathode active material.
Discussion of the Results Example 1: P2-$Na_{0.67}Ni_{0.33}Mn_{0.67}O_2$ FIG. 1(A) shows the X-ray diffraction pattern of the known material $Na_{0.67}Ni_{0.33}Mn_{0.67}O_2$ (sample number X1657). The pattern shows that this material conforms to a layered P2-type structure.
Referring to FIG. 1(B)-(C):

The data shown in FIG. 1(B)-(C) are derived from the constant current cycling data for a P2-$Na_{0.67}Ni_{0.33}Mn_{0.67}O_2$ cathode active material in a Na-ion cell (Cell#311044) where this cathode material was coupled with a Hard Carbon (Carbotron P(J)) anode material. The electrolyte used was a 0.5 M solution of $NaClO_4$ in propylene carbonate (PC). The constant current data were collected at an approximate current density of 0.2 mA/cm² between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 1(B) shows the cell voltage profile (i.e. Na-ion Cell Voltage [V] versus Cumulative Cathode Specific Capacity [mAh/g]) for the first 4 charge/discharge cycles of the Hard Carbon//$Na_{0.67}Ni_{0.33}Mn_{0.67}O_2$ cell. These data demonstrate that the level of voltage hysteresis (i.e. the voltage difference between the charge and discharge processes) is large indicating the relatively poor kinetic reversibility of the Na-ion extraction-insertion reactions in this cathode material.

FIG. 1(C) shows the constant current cycle life profile, i.e. the relationship between Cathode Specific Capacity for Discharge [mAh/g] and cycle number for the Hard Carbon//P2-$Na_{0.67}Ni_{0.33}Mn_{0.67}O_2$ cell. For cycle 1 the discharge specific capacity for the cathode is about 127 mAh/g. For cycle 20 the discharge specific capacity for the cathode is about 61 mAh/g. This represents a capacity fade of about 52% over 20 cycles or an average of 2.6% per cycle. The cathode material under test clearly demonstrates relatively poor capacity retention behaviour.

Example 2: P2-$Na_{0.67}Ni_{0.3}Mn_{0.6}Mg_{0.033}Ti_{0.067}O_2$

Figure 2A:
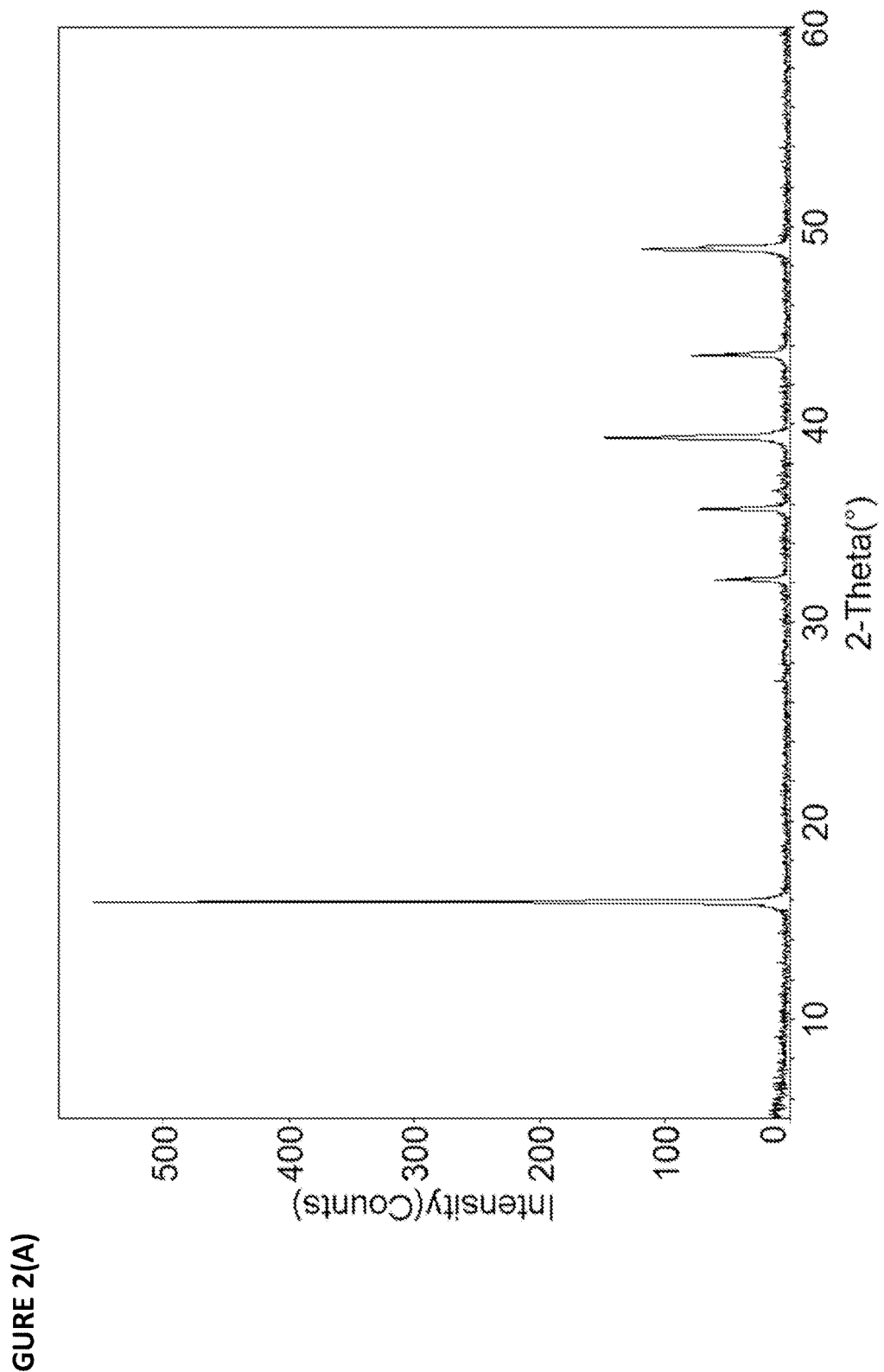
FIG. 2(A) is the XRD profile for the P2-Target Active Material of the present invention with the formula: P2-Na$_{0.67}$Ni$_{0.3}$Mn$_{0.6}$Mg$_{0.033}$Ti$_{0.067}$O$_2$, as made in Example 2.

FIG. 2(A) shows the X-ray diffraction pattern of $Na_{0.67}Ni_{0.3}Mn_{0.6}Mg_{0.033}Ti_{0.067}O_2$ (sample number X1659). The pattern shows that the sample conforms to a layered P2-type structure.

Figure 2B:
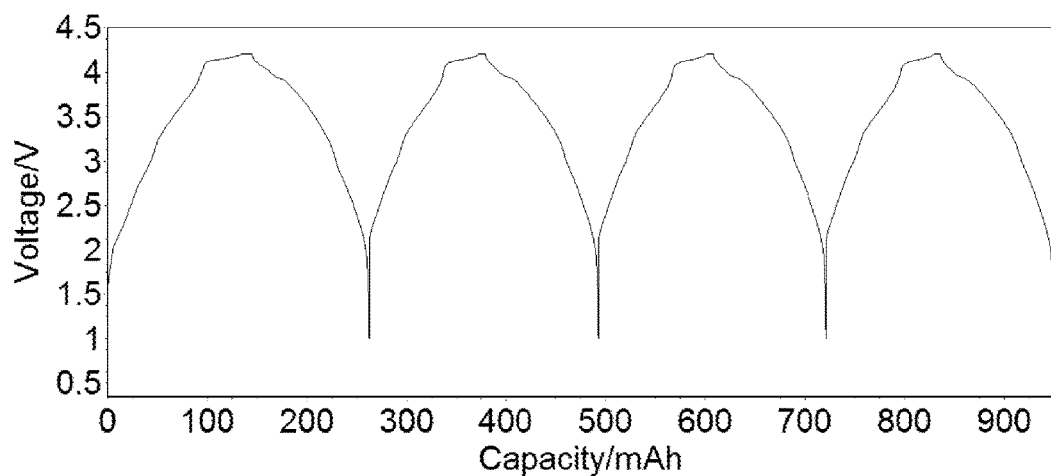
FIG. 2(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.3}$Mn$_{0.6}$Mg$_{0.033}$Ti$_{0.067}$O$_2$ cell.
Figure 2C:
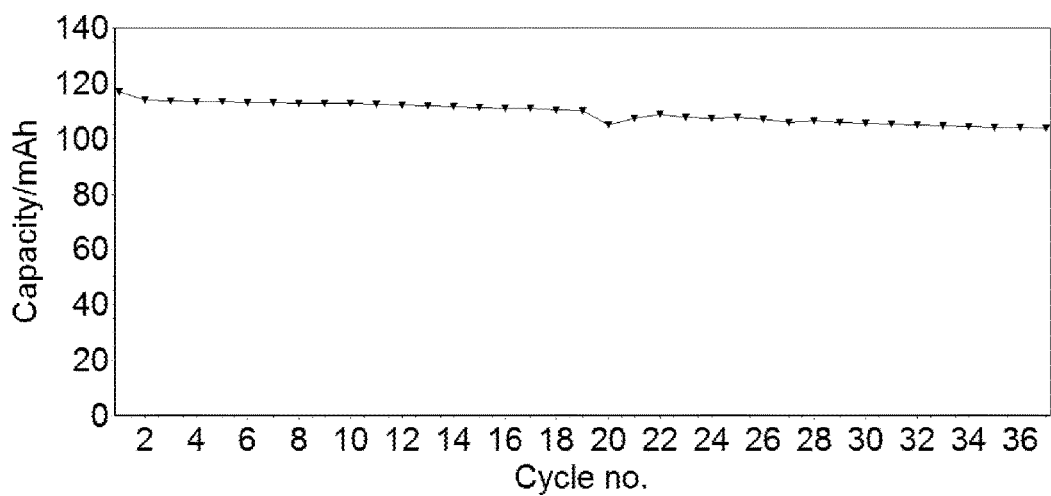
FIG. 2(C) shows the Constant current cycling (CC/CV) of full Na-ion Cell comprising hard carbon (Carbotron P(J) Kureha) and P2-Na$_{0.67}$Ni$_{0.3}$Mn$_{0.6}$Mg$_{0.033}$Ti$_{0.067}$O$_2$ in the voltage range 1.0-4.2V at 30° C. in 0.5M NaClO$_4$, propylene carbonate (PC) and GF/A.

Referring to FIG. 2(B)-(C):

The data shown in FIG. 2(B)-(C) are derived from the constant current cycling data for a P2-$Na_{0.67}Ni_{0.30}Mn_{0.60}Mg_{0.033}Ti_{0.067}O_2$ cathode active material in a Na-ion cell (Cell#311051) where this cathode material was coupled with a Hard Carbon (Carbotron P(J)) anode material. The electrolyte used was a 0.5 M solution of $NaClO_4$ in propylene carbonate (PC). The constant current data were collected at an approximate current density of 0.2 mA/cm$^2$ between voltage limits of 1.00 and 4.2 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 2(B) shows the cell voltage profile (i.e. Na-ion Cell Voltage [V] versus Cumulative Cathode Specific Capacity [mAh/g]) for the first 4 charge/discharge cycles of the Hard Carbon//P2-$Na_{0.67}Ni_{0.30}Mn_{0.60}Mg_{0.033}Ti_{0.067}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 2(C) shows the constant current cycle life profile, i.e. the relationship between Cathode Specific Capacity for Discharge [mAh/g] and cycle number for the Hard Carbon//P2-$Na_{0.67}Ni_{0.30}Mn_{0.60}Mg_{0.033}Ti_{0.067}O_2$ cell. For cycle 1 the discharge specific capacity for the cathode is about 117 mAh/g. For cycle 30 the discharge specific capacity for the cathode is about 106 mAh/g. This represent a capacity fade of about 9.4% over 30 cycles or an average of 0.3% per cycle. The cathode material under test clearly demonstrates excellent capacity retention behaviour.

Example 3: P2-$Na_{0.67}Ni_{0.267}Mn_{0.533}Mg_{0.067}Ti_{0.133}O_2$

Figure 3A:
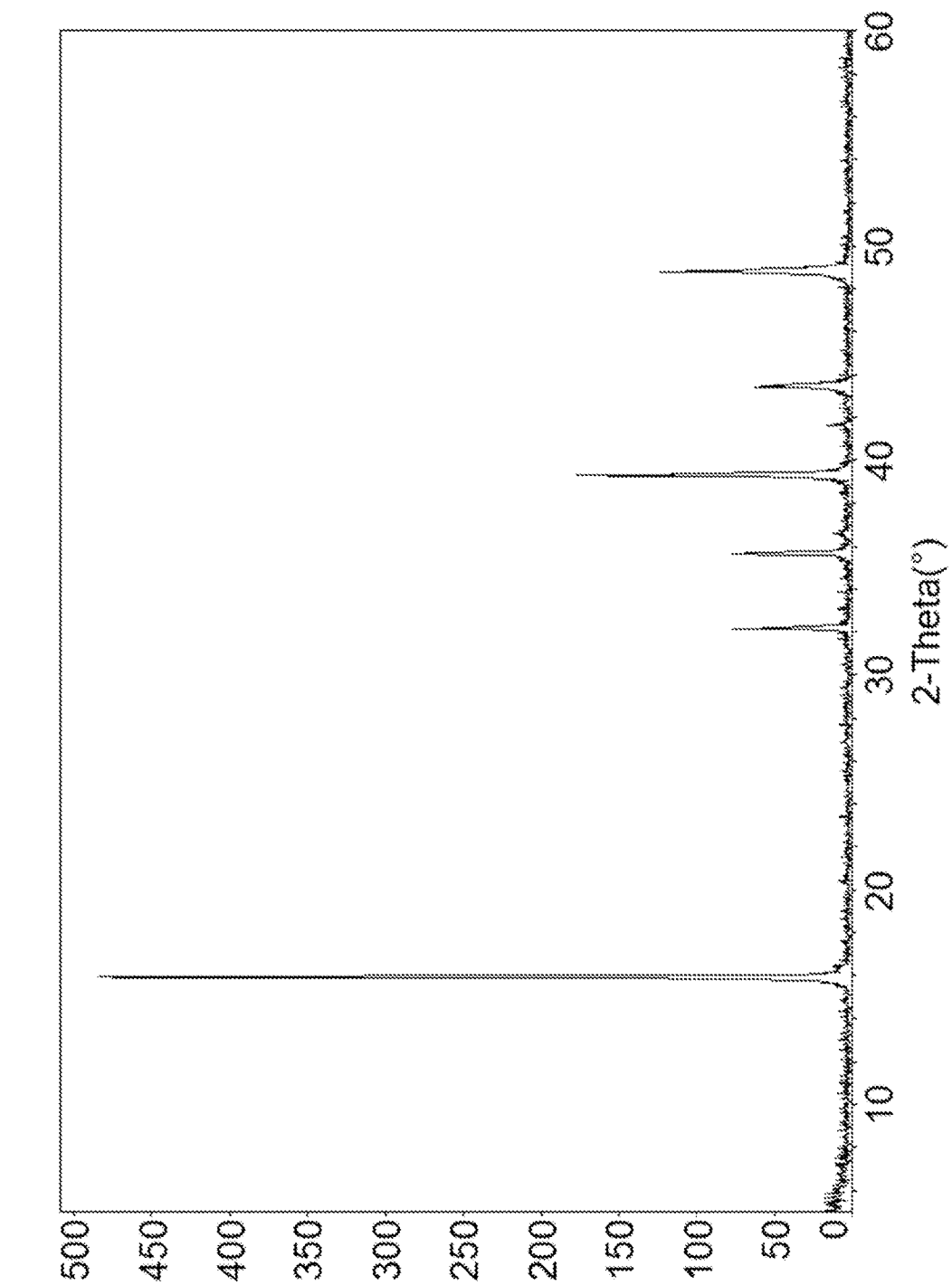
FIG. 3(A) is the XRD profile for the P2-Target Active Material of the present invention with the formula: P2-Na$_{0.67}$Ni$_{0.267}$Mn$_{0.533}$Mg$_{0.067}$Ti$_{0.133}$O$_2$, as made in Example 3.

FIG. 3(A) shows the X-ray diffraction pattern of $Na_{0.67}Ni_{0.267}Mn_{0.533}Mg_{0.067}Ti_{0.133}O_2$ (sample number X1663). The pattern shows that the sample conforms to a layered P2-type structure.

Figure 3B:
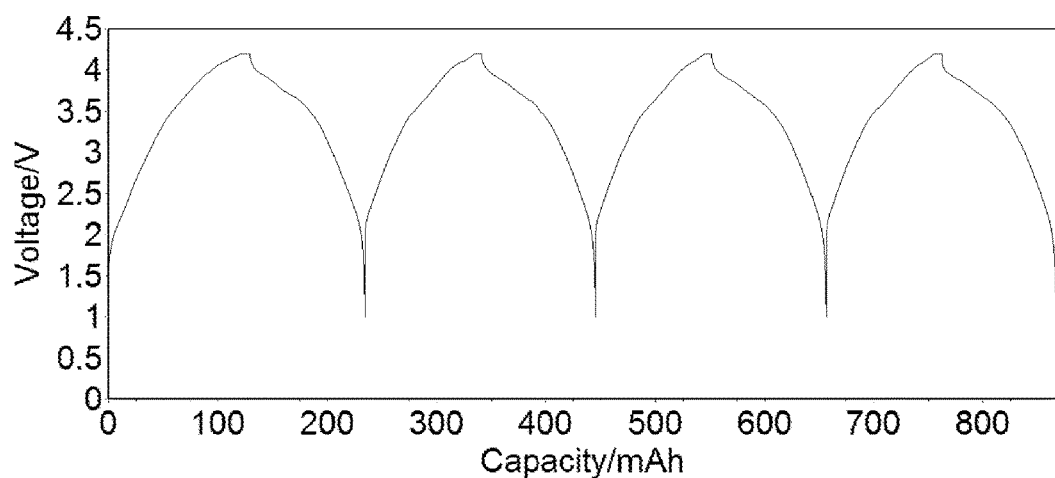
FIG. 3(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.267}$Mn$_{0.533}$Mg$_{0.067}$Ti$_{0.133}$O$_2$ cell.
Figure 3C:
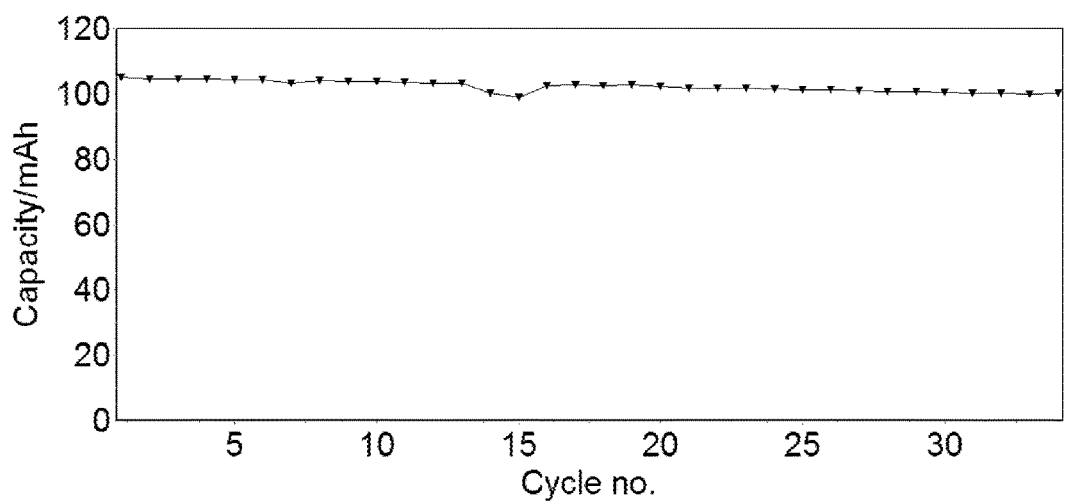
FIG. 3(C) shows the Constant current cycling (CC/CV) of full Na-ion Cell comprising hard carbon (Carbotron P(J) Kureha) and P2-Na$_{0.67}$Ni$_{0.267}$Mn$_{0.533}$Mg$_{0.067}$Ti$_{0.133}$O$_2$ in the voltage range 1.0-4.2V at 30° C. in 0.5M NaClO$_4$, propylene carbonate (PC) and GF/A.

Referring to FIG. 3(B)-(C):

The data shown in FIG. 3(B)-(C) are derived from the constant current cycling data for a P2-$Na_{0.67}Ni_{0.267}Mn_{0.533}Mg_{0.067}Ti_{0.133}O_2$ cathode active material in a Na-ion cell (Cell#311058) where this cathode material was coupled with a Hard Carbon (Carbotron P(J)) anode material. The electrolyte used was a 0.5 M solution of $NaClO_4$ in propylene carbonate (PC). The constant current data were collected at an approximate current density of 0.2 mA/cm$^2$ between voltage limits of 1.00 and 4.2 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 3(B) shows the cell voltage profile (i.e. Na-ion Cell Voltage [V] versus Cumulative Cathode Specific Capacity [mAh/g]) for the first 4 charge/discharge cycles of the Hard Carbon//P2-$Na_{0.67}Ni_{0.267}Mn_{0.533}Mg_{0.067}Ti_{0.133}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 3(C) shows the constant current cycle life profile, i.e. the relationship between Cathode Specific Capacity for Discharge [mAh/g] and cycle number for the Hard Carbon//P2-$Na_{0.67}Ni_{0.267}Mn_{0.533}Mg_{0.067}Ti_{0.133}O_2$ cell. For cycle 1 the discharge specific capacity for the cathode is about 105 mAh/g. For cycle 30 the discharge specific capacity for the cathode is about 101 mAh/g. This represents a capacity fade of about 3.8% over 30 cycles or an average of 0.13% per cycle. The cathode material under test clearly demonstrates excellent capacity retention behaviour.

Example 4: P2-$Na_{0.67}Ni_{0.25}Mn_{0.667}Mg_{0.083}O_2$

Figure 4A:
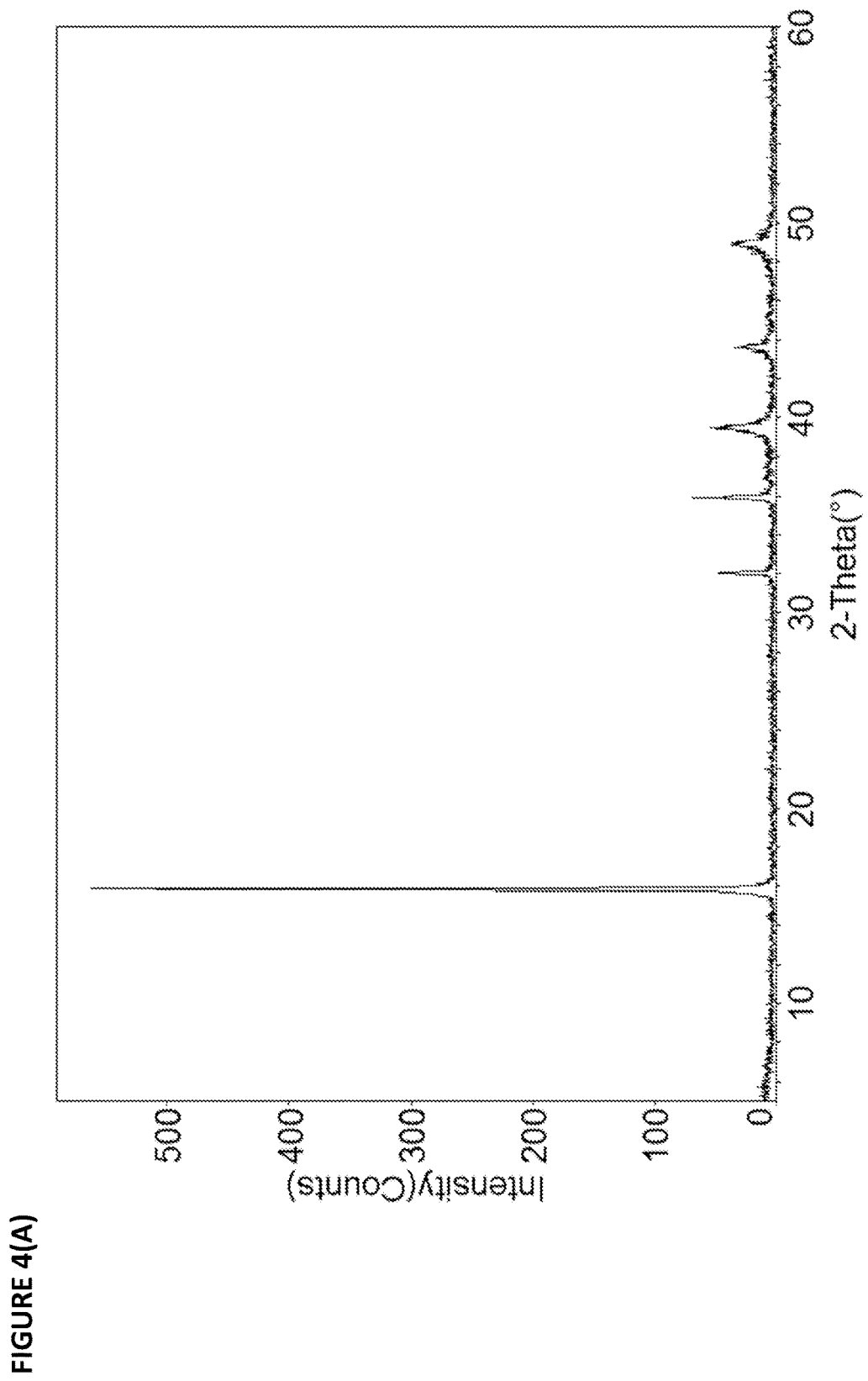
FIG. 4(A) is the XRD profile for the P2-Target Active Material of the present invention with the formula: P2-Na$_{0.67}$Ni$_{0.25}$Mn$_{0.667}$Mg$_{0.083}$O$_2$, as made in Example 4.

FIG. 4(A) shows the X-ray diffraction pattern of $Na_{0.67}Ni_{0.25}Mn_{0.667}Mg_{0.083}O_2$ (sample number X1684). The pattern shows that the sample conforms to a layered P2-type structure.

Figure 4B:
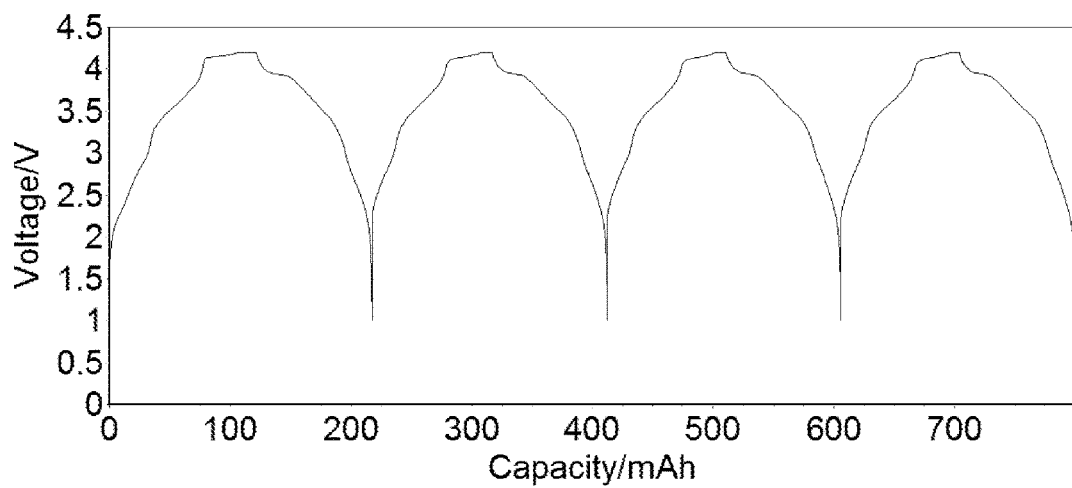
FIG. 4(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.25}$Mn$_{0.667}$Mg$_{0.83}$O$_2$ cell
Figure 4C:
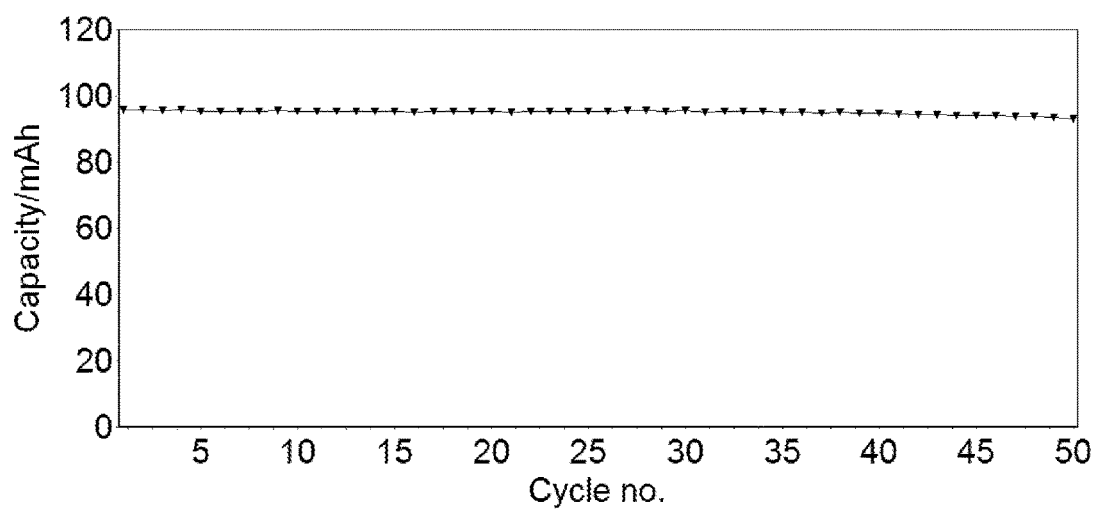
FIG. 4(C) shows the Constant current cycling (CC/CV) of full Na-ion Cell comprising hard carbon (Carbotron P(J) Kureha) and P2-Na$_{0.67}$Ni$_{0.25}$Mn$_{0.667}$Mg$_{0.083}$O$_2$ in the voltage range 1.0-4.2V at 30° C. in 0.5M NaClO$_4$, propylene carbonate (PC) and GF/A.

Referring to FIG. 4(B)-(C):

The data shown in FIG. 4(B)-(C) are derived from the constant current cycling data for a P2-$Na_{0.67}Ni_{0.25}Mn_{0.667}Mg_{0.083}O_2$ cathode active material in a Na-ion cell (Cell#312020) where this cathode material was coupled with a Hard Carbon (Carbotron P(J)) anode material. The electrolyte used was a 0.5 M solution of $NaClO_4$ in propylene carbonate (PC). The constant current data were collected at an approximate current density of 0.2 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 4(B) shows the cell voltage profile (i.e. Na-ion Cell Voltage [V] versus Cumulative Cathode Specific Capacity [mAh/g]) for the first 4 charge/discharge cycles of the Hard Carbon//P2-$Na_{0.67}Ni_{0.25}Mn_{0.667}Mg_{0.083}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 4(C) shows the constant current cycle life profile, i.e. the relationship between Cathode Specific Capacity for Discharge [mAh/g] and cycle number for the Hard Carbon//P2-Na$_{0.67}$Ni$_{0.25}$Mn$_{0.667}$Mg$_{0.083}$O$_2$ cell. For cycle 1 the discharge specific capacity for the cathode is about 96 mAh/g. For cycle 30 the discharge specific capacity for the cathode is about 95 mAh/g. This represents a capacity fade of about 1.0% over 30 cycles or an average of 0.03% per cycle. The cathode material under test clearly demonstrates excellent capacity retention behaviour.

Example 5: P2-Na$_{0.67}$Ni$_{0.283}$Mn$_{0.567}$Mg$_{0.05}$Ti$_{0.1}$O$_2$

Figure 5A:
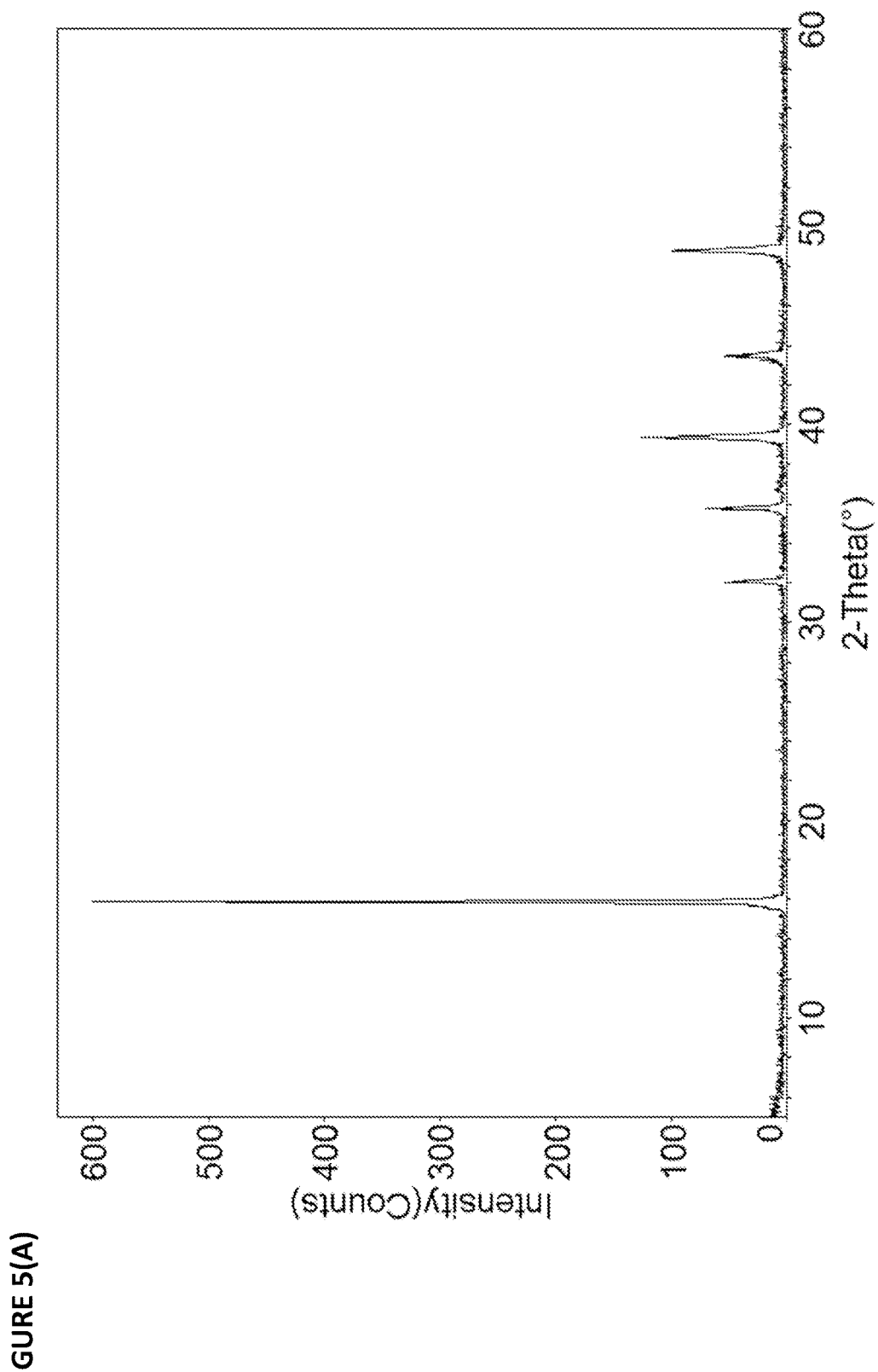
FIG. 5(A) is the XRD profile for the P2-Target Active Material of the present invention with the formula: P2-Na$_{0.67}$Ni$_{0.283}$Mn$_{0.567}$Mg$_{0.05}$Ti$_{0.10}$O$_2$, as made in Example 5.

FIG. 5(A) shows the X-ray diffraction pattern of Na$_{0.67}$Ni$_{0.283}$Mn$_{0.567}$Mg$_{0.05}$Ti$_{0.1}$O$_2$ (sample number X1713). The pattern shows that the sample conforms to a layered P2-type structure.

Figure 5B:
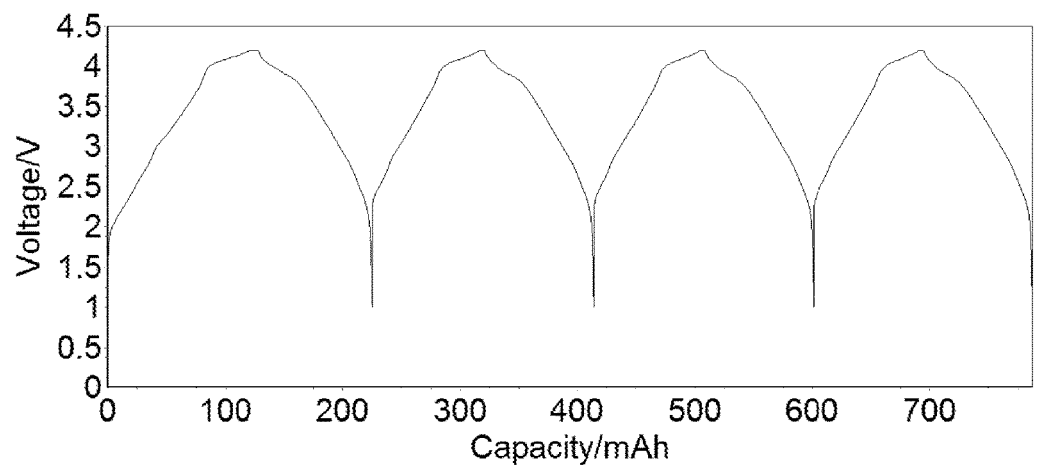
FIG. 5(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.283}$Mn$_{0.567}$Mg$_{0.05}$Ti$_{0.10}$O$_2$ cell.
Figure 5C:
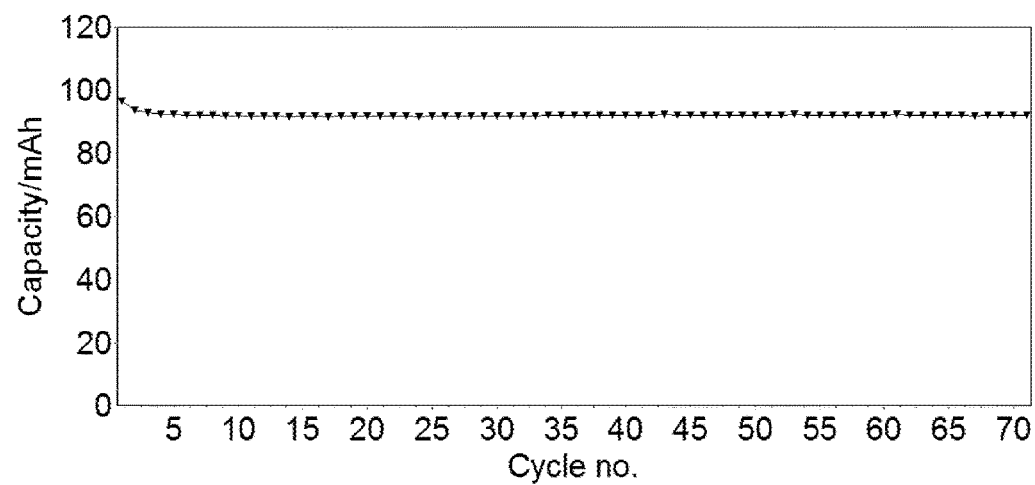
FIG. 5(C) shows the Constant current cycling (CC/CV) of full Na-ion Cell comprising hard carbon (Carbotron P(J) Kureha) and P2-Na$_{0.67}$Ni$_{0.283}$Mn$_{0.567}$Mg$_{0.05}$Ti$_{0.1}$O$_2$ in the voltage range 1.0-4.2V at 30° C. in 0.5M NaClO$_4$, propylene carbonate (PC) and GF/A.

Referring to FIG. 5(B)-(C):

The data shown in FIG. 5(B)-(C) are derived from the constant current cycling data for a P2-Na$_{0.67}$Ni$_{0.283}$Mn$_{0.567}$Mg$_{0.05}$Ti$_{0.10}$O$_2$ cathode active material in a Na-ion cell (Cell#401018) where this cathode material was coupled with a Hard Carbon (Carbotron P(J)) anode material. The electrolyte used was a 0.5 M solution of NaClO$_4$ in propylene carbonate (PC). The constant current data were collected at an approximate current density of 0.2 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 5(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.283}$Mn$_{0.567}$Mg$_{0.05}$Ti$_{0.10}$O$_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 5(C) shows the constant current cycle life profile, i.e. the relationship between Cathode Specific Capacity for Discharge [mAh/g] and cycle number for the Hard Carbon//P2-Na$_{0.67}$Ni$_{0.283}$Mn$_{0.567}$Mg$_{0.05}$Ti$_{0.10}$O$_2$ cell. For cycle 1 the discharge specific capacity for the cathode is about 97 mAh/g. For cycle 30 the discharge specific capacity for the cathode is about 92 mAh/g. This represents a capacity fade of about 5.2% over 30 cycles or an average of 0.17% per cycle. The cathode material under test clearly demonstrates excellent capacity retention behaviour.

Example 6:
P2-Na$_{0.7}$Ni$_{0.240}$Mn$_{0.533}$Mg$_{0.1}$100Ti$_{0.117}$O$_2$

Figure 6A:
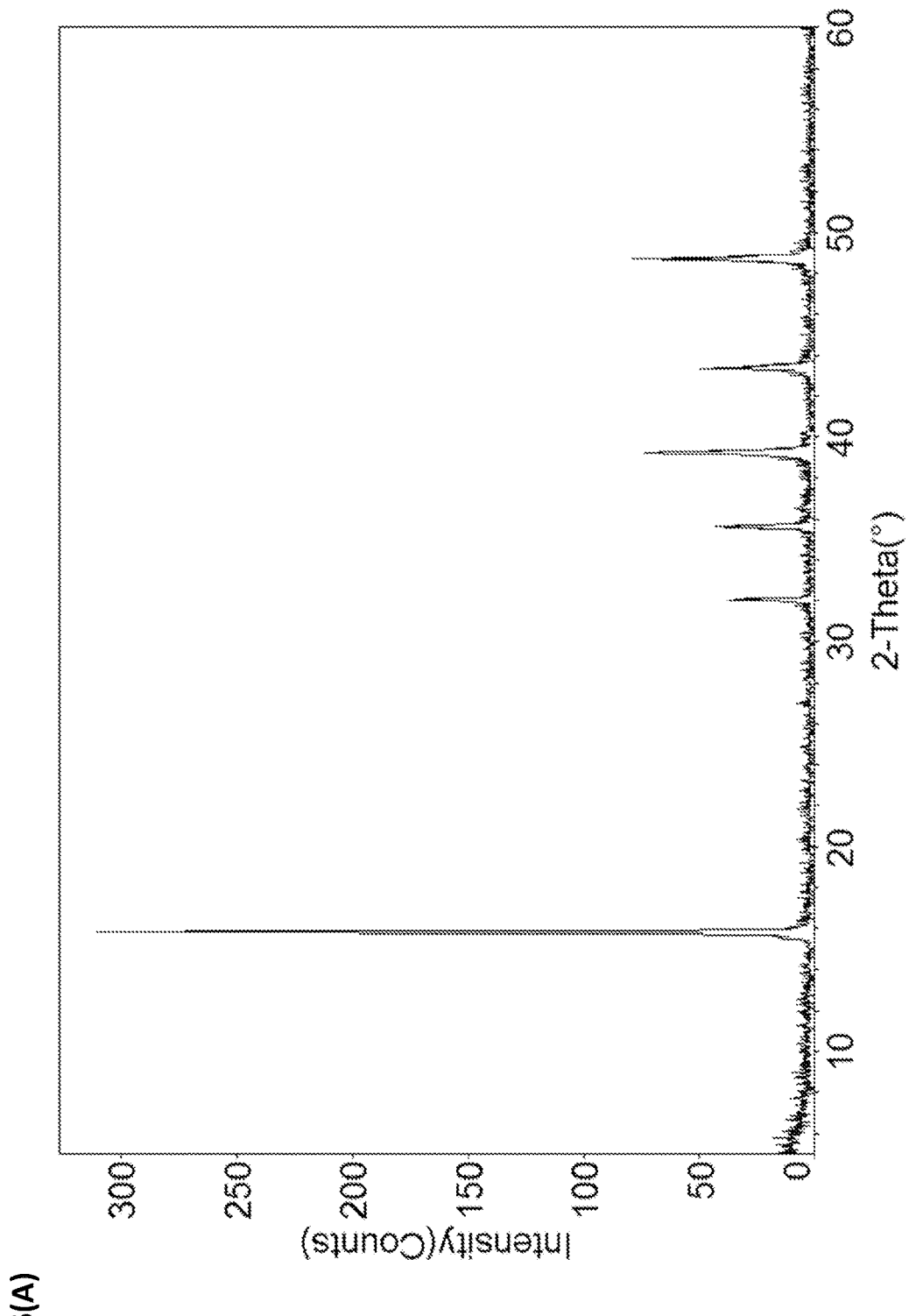
FIG. 6(A) is the XRD profile for the P2-Target Active Material of the present invention with the formula: P2-Na$_{0.70}$Ni$_{0.240}$Mn$_{0.533}$Mg$_{0.110}$Ti$_{0.117}$O$_2$, as made in Example 6.

FIG. 6(A) shows the X-ray diffraction pattern of Na$_{0.7}$Ni$_{0.24}$Mn$_{0.533}$Mg$_{0.110}$Ti$_{0.117}$O$_2$ (sample number X1919). The pattern shows that the sample conforms to a layered P2-type structure.

Figure 6B:
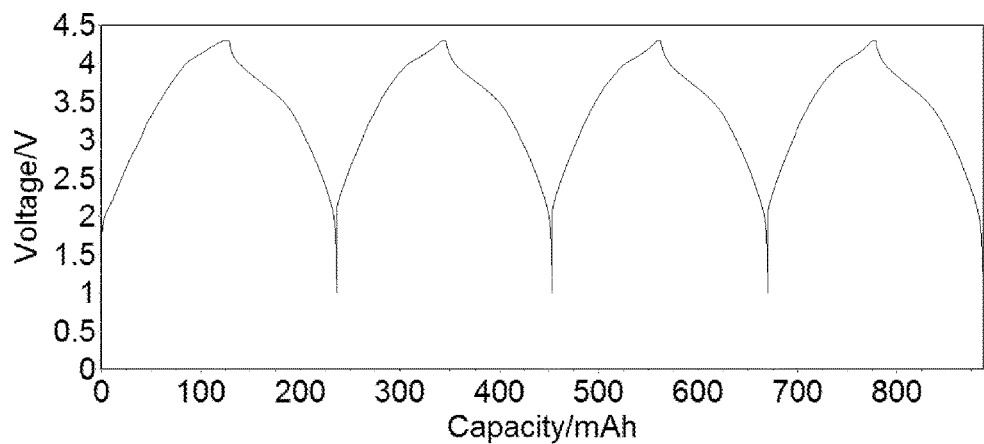
FIG. 6(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.70}$Ni$_{0.240}$Mn$_{0.533}$Mg$_{0.110}$Ti$_{0.117}$O$_2$ cell.
Figure 6C:
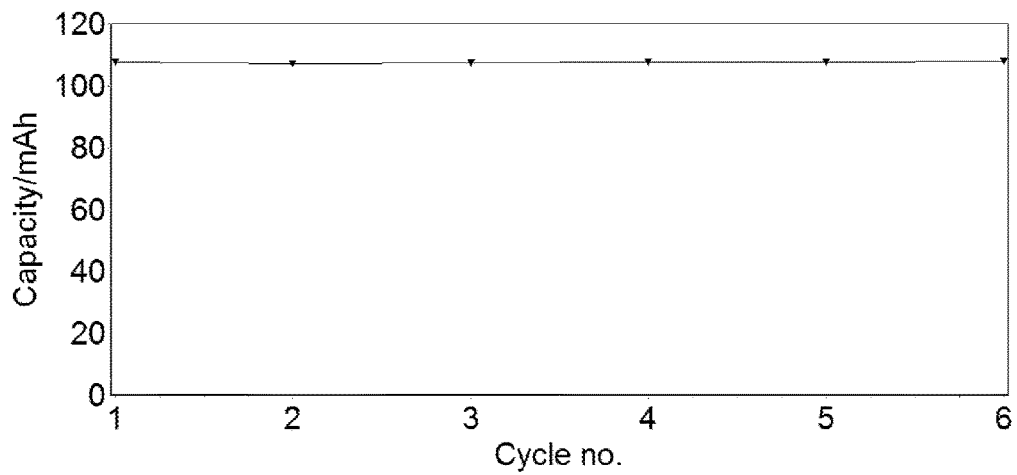
FIG. 6(C) shows the Constant current cycle life profile (cathode specific capacity for discharge versus cycle number) for a full Na-ion Cell comprising hard carbon (Carbotron P(J) Kureha) and P2-Na$_{0.70}$Ni$_{0.240}$Mn$_{0.533}$Mg$_{0.110}$Ti$_{0.117}$O$_2$ in the voltage range 1.0-4.3V at 30° C. in 0.5M NaPF$_6$ in ethylene carbonate/diethyl carbonate/propylene carbonate.

Referring to FIG. 6(B)-(C).

The data shown in FIG. 6(B)-(C) are derived from the constant current cycling data for a P2-Na$_{0.70}$Ni$_{0.240}$Mn$_{0.533}$Mg$_{0.110}$Ti$_{0.117}$O$_2$ cathode active material in a Na-ion cell (Cell#410001) where this cathode material was coupled with a Hard Carbon (Carbotron P(J)) anode material. The electrolyte used was a 0.5 M solution of NaPF$_6$ in ethylene carbonate/diethyl carbonate/propylene carbonate. The constant current data were collected at an approximate current density of 0.2 mA/cm$^2$ between voltage limits of 1.00 and 4.30 V. To ensure that the Na-ion cell was fully charged, the cell was potentiostatically held at 4.3 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 6(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.70}$Ni$_{0.240}$Mn$_{0.533}$Mg$_{0.110}$Ti$_{0.117}$O$_2$ cell. These data demonstrate that the level of voltage hysteresis (i.e. the voltage difference between the charge and discharge processes) is small indicating the excellent kinetic reversibility of the Na-ion extraction-insertion reactions in this cathode material.

FIG. 6(C) shows the constant current cycle life profile, i.e. the relationship between Cathode Specific Capacity for Discharge [mAh/g] and cycle number for the Hard Carbon//P2-Na$_{0.70}$Ni$_{0.240}$Mn$_{0.533}$Mg$_{0.110}$Ti$_{0.117}$O$_2$ cell. For cycle 1 the discharge specific capacity for the cathode is about 108 mAh/g. For cycle 6 the discharge specific capacity for the cathode is about 108 mAh/g. This represents a capacity fade of about 0% over 4 cycles. The cathode material under test clearly demonstrates excellent capacity retention behaviour.

Example 7:
P2-Na$_{0.60}$Ni$_{0.240}$Mn$_{0.533}$Mg$_{0.060}$Ti$_{0.167}$O$_2$

Figure 7A:
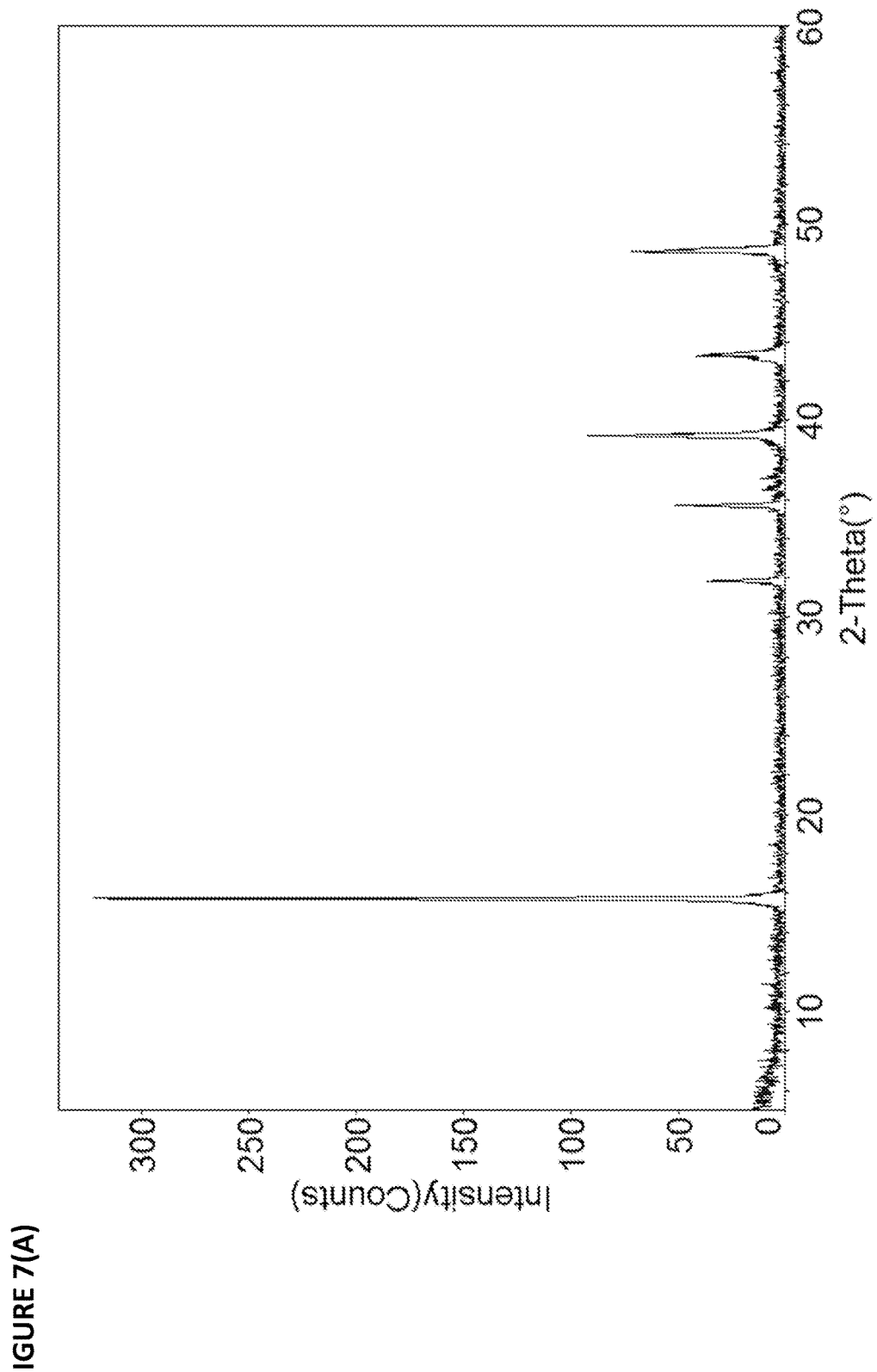
FIG. 7(A) is the XRD profile for the P2-Target Active Material of the present invention with the formula: P2-Na$_{0.60}$Ni$_{0.240}$Mn$_{0.533}$Mg$_{0.060}$Ti$_{0.167}$O$_2$, as made in Example 7.

FIG. 7(A) shows the X-ray diffraction pattern of Na$_{0.6}$Ni$_{0.24}$Mn$_{0.533}$Mg$_{0.060}$Ti$_{0.167}$O$_2$ (sample number X1921). The pattern shows that the sample conforms to a layered P2-type structure.

Figure 7B:
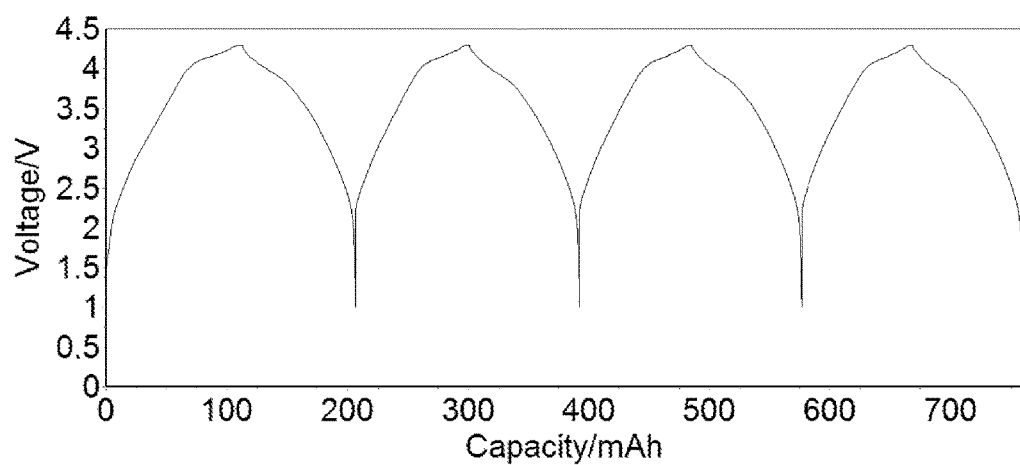
FIG. 7(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.60}$Ni$_{0.240}$Mn$_{0.533}$Mg$_{0.060}$Ti$_{0.1}$67O$_2$ cell.
Figure 7C:
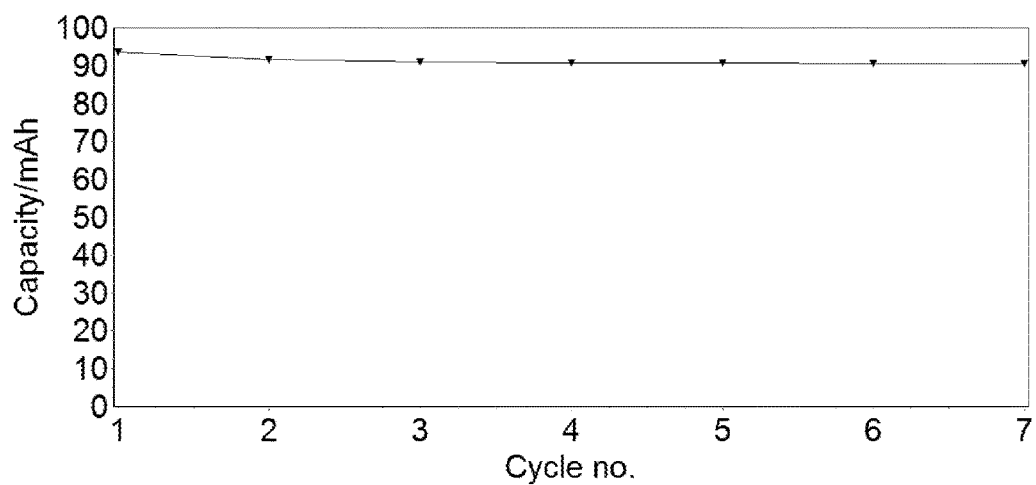
FIG. 7(C) shows the Constant current cycle life profile (Cathode specific Capacity for Discharge versus cycle number) for a full Na-ion Cell comprising hard carbon (Carbotron P(J) Kureha) and P2-Na$_{0.60}$Ni$_{0.240}$Mn$_{0.533}$Mg$_{0.060}$Ti$_{0.167}$O$_2$ in the voltage range 1.0-4.3V at 30° C. in 0.5M NaPF$_6$ in ethylene carbonate/diethyl carbonate/propylene carbonate.

Referring to FIG. 7(B)-(C).

The data shown in FIG. 7(B)-(C) are derived from the constant current cycling data for a P2-Na$_{0.60}$Ni$_{0.240}$Mn$_{0.533}$Mg$_{0.060}$Ti$_{0.167}$O$_2$ cathode active material in a Na-ion cell (Cell#410003) where this cathode material was coupled with a Hard Carbon (Carbotron P(J)) anode material. The electrolyte used was a 0.5 M solution of NaPF$_6$ in ethylene carbonate/diethyl carbonate/propylene carbonate. The constant current data were collected at an approximate current density of 0.2 mA/cm$^2$ between voltage limits of 1.00 and 4.30 V. To ensure that the Na-ion cell was fully charged, the cell was potentiostatically held at 4.3 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 7(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.60}$Ni$_{0.240}$Mn$_{0.533}$Mg$_{0.060}$Ti$_{0.167}$O$_2$ cell. These data demonstrate that the level of voltage hysteresis (i.e. the voltage difference between the charge and discharge processes) is small indicating the excellent kinetic reversibility of the Na-ion extraction-insertion reactions in this cathode material.

FIG. 7(C) shows the constant current cycle life profile, i.e. the relationship between Cathode Specific Capacity for Discharge [mAh/g] and cycle number for the Hard Carbon//P2-Na$_{0.60}$Ni$_{0.240}$Mn$_{0.533}$Mg$_{0.060}$Ti$_{0.167}$O$_2$ cell. For cycle 1 the discharge specific capacity for the cathode is about 94 mAh/g. For cycle 7 the discharge specific capacity for the cathode is about 91 mAh/g. This represents a capacity fade of about 3% over 7 cycles. The cathode material under test clearly demonstrates good capacity retention behaviour.

Example 8:
P2-Na$_{0.67}$Ni$_{0.240}$Mn$_{0.533}$Mg$_{0.093}$Ti$_{0.133}$O$_2$

Figure 8A:
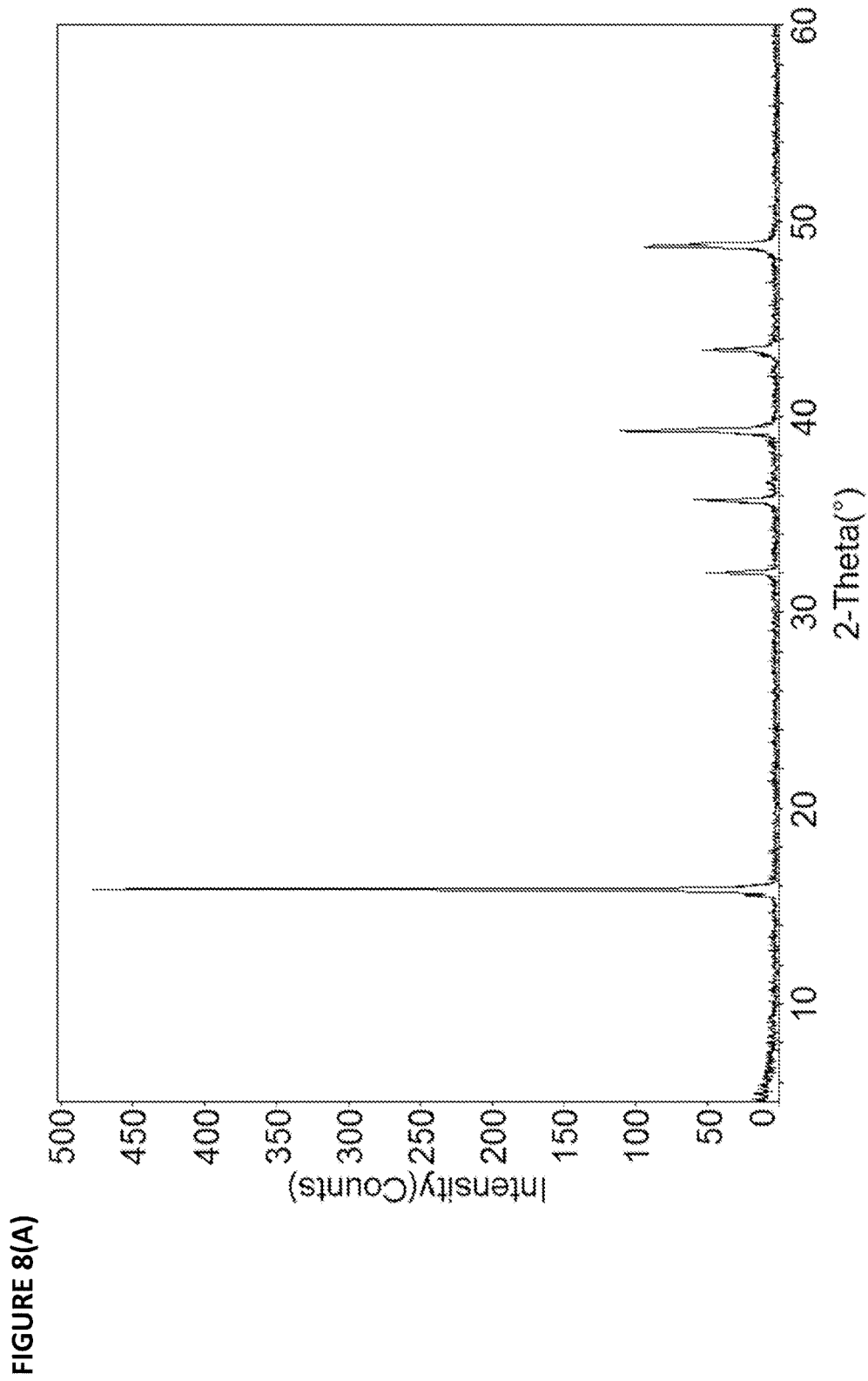
FIG. 8(A) is the XRD profile for the P2-Target Active Material of the present invention with the formula: P2-Na$_{0.67}$Ni$_{0.240}$Mn$_{0.533}$Mg$_{0.093}$Ti$_{0.133}$O$_2$, as made in Example 8.

FIG. 8(A) shows the X-ray diffraction pattern of Na$_{0.67}$Ni$_{0.240}$Mn$_{0.533}$Mg$_{0.093}$Ti$_{0.133}$O$_2$ (sample number X1922). The pattern shows that the sample conforms to a layered P2-type structure.

Figure 8B:
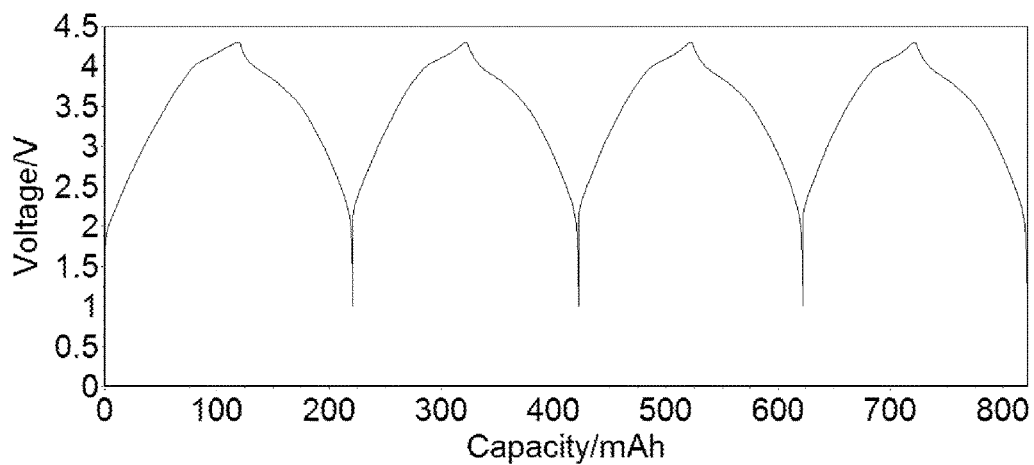
FIG. 8(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.240}$Mn$_{0.533}$Mg$_{0.093}$Ti$_{0.1}$33O$_2$ cell.
Figure 8C:
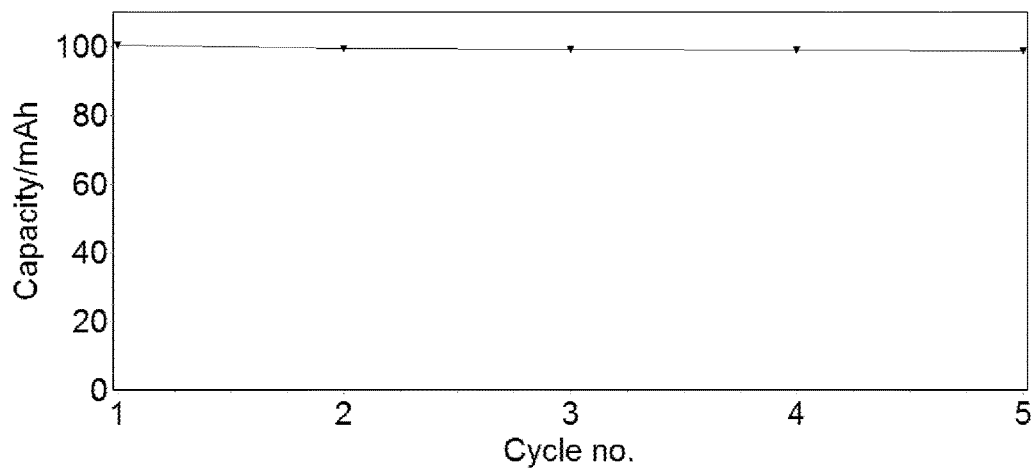
FIG. 8(C) shows the Constant current cycle life profile (Cathode Specific Capacity for Discharge versus cycle number) for a full Na-ion Cell comprising hard carbon (Carbotron P(J) Kureha) and P2-Na$_{0.67}$Ni$_{0.24}$Mn$_{0.533}$Mg$_{0.093}$Ti$_{0.133}$O$_2$ in the voltage range 1.0-4.3V at 30° C. in 0.5M NaPF$_6$ in ethylene carbonate/diethyl carbonate/propylene carbonate.

Referring to FIG. 8(B)-(C).

The data shown in FIG. 8(B)-(C) are derived from the constant current cycling data for a P2-Na$_{0.67}$Ni$_{0.240}$Mn$_{0.533}$Mg$_{0.093}$Ti$_{0.133}$O$_2$ cathode active material in a Na-ion cell (Cell#410004) where this cathode material was coupled with a Hard Carbon (Carbotron P(J)) anode material. The electrolyte used was a 0.5 M solution of NaPF$_6$ in ethylene carbonate/diethyl carbonate/propylene carbonate. The constant current data were collected at an approximate current density of 0.2 mA/cm$^2$ between voltage limits of 1.00 and 4.30 V. To ensure that the Na-ion cell was fully charged, the cell was potentiostatically held at 4.3 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 8(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.240}$Mn$_{0.533}$Mg$_{0.093}$Ti$_{0.133}$O$_2$ cell. These data demonstrate that the level of voltage hysteresis (i.e. the voltage difference between the charge and discharge processes) is small confirming the excellent kinetic reversibility of the Na-ion extraction-insertion reactions in this cathode material.

FIG. 8(C) shows the constant current cycle life profile, i.e. the relationship between Cathode Specific Capacity for Discharge [mAh/g] and cycle number for the Hard Carbon//P2-Na$_{0.67}$Ni$_{0.240}$Mn$_{0.533}$Mg$_{0.093}$Ti$_{0.133}$O$_2$ cell. For cycle 1 the discharge specific capacity for the cathode is about 100 mAh/g. For cycle 5 the discharge specific capacity for the cathode is about 99 mAh/g. This represents a capacity fade of about 1% over 5 cycles. The cathode material under test clearly demonstrates excellent capacity retention behaviour.

Example 9:
P2-Na$_{0.55}$Ni$_{0.240}$Mn$_{0.533}$Mg$_{0.035}$Ti$_{0.192}$O$_2$

Figure 9A:
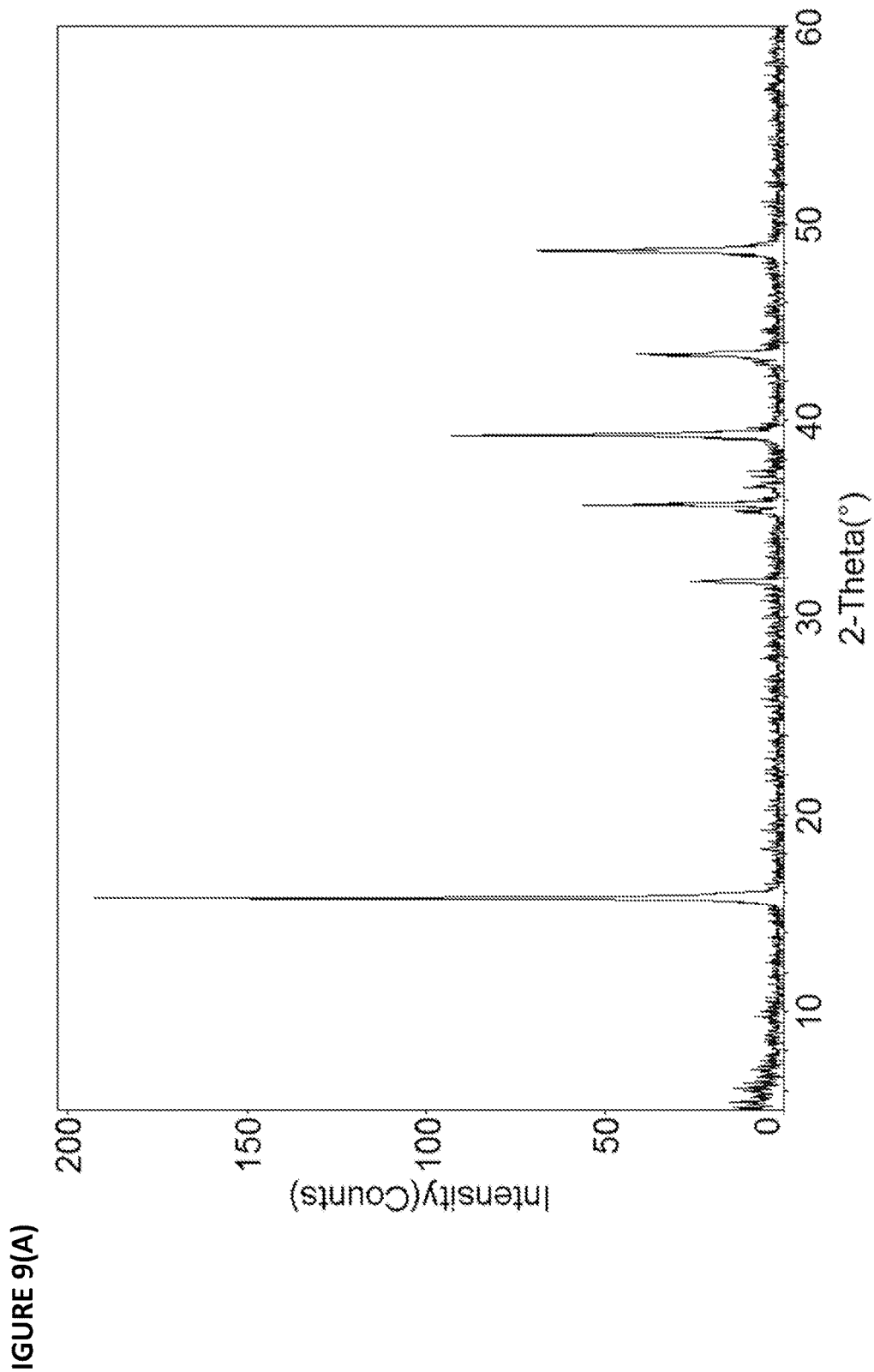
FIG. 9(A) is the XRD profile for the P2-Target Active Material of the present invention with the formula: P2-Na$_{0.55}$Ni$_{0.240}$Mn$_{0.533}$Mg$_{0.035}$Ti$_{0.192}$O$_2$, as made in Example 9.

FIG. 9(A) shows the X-ray diffraction pattern of Na$_{0.55}$Ni$_{0.240}$Mn$_{0.533}$Mg$_{0.035}$Ti$_{0.192}$O$_2$ (sample number X1923). The pattern shows that the sample conforms to a layered P2-type structure.

Figure 9B:
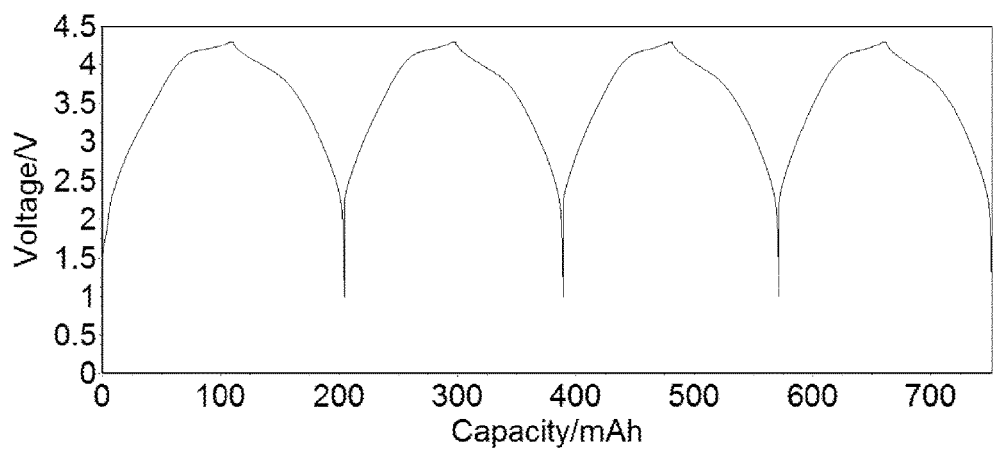
FIG. 9(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.55}$Ni$_{0.240}$Mn$_{0.533}$Mg$_{0.035}$Ti$_{0.1}$92O$_2$ cell.
Figure 9C:
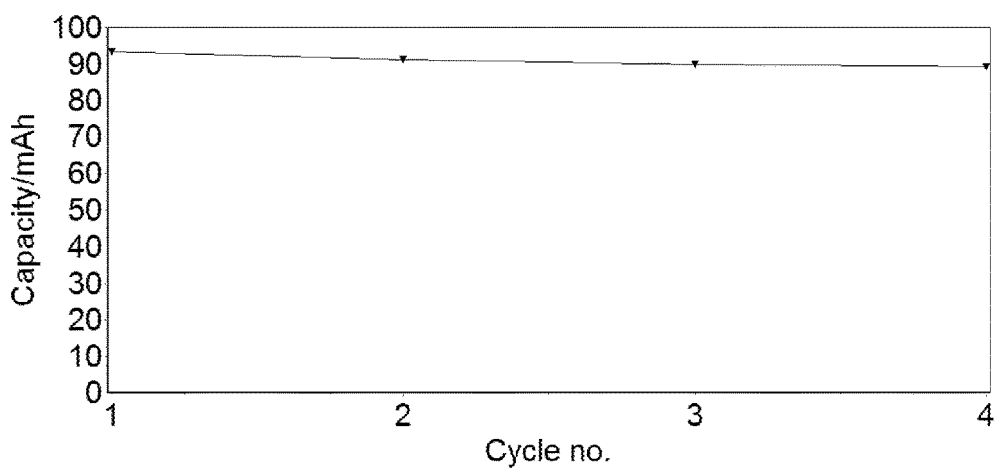
FIG. 9(C) shows the Constant current cycle life profile (Cathode Specific Capacity for Discharge versus cycle number) for a full Na-ion Cell comprising hard carbon (Carbotron P(J) Kureha) and P2-Na$_{0.55}$Ni$_{0.240}$Mn$_{0.533}$Mg$_{0.035}$Ti$_{0.192}$O$_2$ in the voltage range 1.0-4.3V at 30° C. in 0.5M NaPF$_6$, in ethylene carbonate/diethyl carbonate/propylene carbonate.

Referring to FIG. 9(B)-(C).

The data shown in FIG. 9(B)-(C) are derived from the constant current cycling data for a P2-Na$_{0.55}$Ni$_{0.240}$Mn$_{0.533}$Mg$_{0.035}$Ti$_{0.192}$O$_2$ cathode active material in a Na-ion cell (Cell#410005) where this cathode material was coupled with a Hard Carbon (Carbotron P(J)) anode material. The electrolyte used was a 0.5 M solution of NaPF$_6$ in ethylene carbonate/diethyl carbonate/propylene carbonate. The constant current data were collected at an approximate current density of 0.2 mA/cm$^2$ between voltage limits of 1.00 and 4.30 V. To ensure that the Na-ion cell was fully charged, the cell was potentiostatically held at 4.3 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 9(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.55}$Ni$_{0.240}$Mn$_{0.533}$Mg$_{0.035}$Ti$_{0.192}$O$_2$ cell. These data demonstrate that the level of voltage hysteresis (i.e. the voltage difference between the charge and discharge processes) is small indicating the excellent kinetic reversibility of the Na-ion extraction-insertion reactions in this cathode material.

FIG. 9(C) shows the constant current cycle life profile, i.e. the relationship between Cathode Specific Capacity for Discharge [mAh/g] and cycle number for the Hard Carbon//P2-Na$_{0.55}$Ni$_{0.240}$Mn$_{0.533}$Mg$_{0.035}$Ti$_{0.192}$O$_2$ cell. For cycle 1 the discharge specific capacity for the cathode is about 93 mAh/g. For cycle 4 the discharge specific capacity for the cathode is about 89 mAh/g. This represents a capacity fade of about 4% over 4 cycles. The cathode material under test demonstrates reasonable capacity retention behaviour.

Example 10:
P2-Na$_{0.67}$Ni$_{0.240}$Mn$_{0.533}$Mg$_{0.043}$Ti$_{0.083}$Fe$_{0.1}$O$_2$ FIG. 10(A) shows the X-ray diffraction pattern of Na$_{0.67}$Ni$_{0.240}$Mn$_{0.533}$Mg$_{0.043}$Ti$_{0.083}$Fe$_{0.1}$O$_2$ (sample number X1926). The pattern shows that the sample conforms to a layered P2-type structure.

Referring to FIG. 10(B)-(C).

The data shown in FIG. 10(B)-(C) are derived from the constant current cycling data for a P2-Na$_{0.67}$Ni$_{0.240}$Mn$_{0.533}$Mg$_{0.043}$Ti$_{0.083}$Fe$_{0.1}$O$_2$ cathode active material in a Na-ion cell (Cell#410006) where this cathode material was coupled with a Hard Carbon (Carbotron P(J)) anode material. The electrolyte used was a 0.5 M solution of NaPF$_6$ in ethylene carbonate/diethyl carbonate/propylene carbonate. The constant current data were collected at an approximate current density of 0.2 mA/cm$^2$ between voltage limits of 1.00 and 4.30 V. To ensure that the Na-ion cell was fully charged, the cell was potentiostatically held at 4.3 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 10(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.240}$Mn$_{0.533}$Mg$_{0.043}$Ti$_{0.083}$Fe$_{0.1}$O$_2$ cell. These data demonstrate that the level of voltage hysteresis (i.e. the voltage difference between the charge and discharge processes) is small indicating the excellent kinetic reversibility of the Na-ion extraction-insertion reactions in this cathode material.

FIG. 10(C) shows the constant current cycle life profile, i.e. the relationship between Cathode Specific Capacity for Discharge [mAh/g] and cycle number for the Hard Carbon//P2-Na$_{0.67}$Ni$_{0.240}$Mn$_{0.533}$Mg$_{0.043}$Ti$_{0.083}$Fe$_{0.1}$O$_2$ cell. For cycle 1 the discharge specific capacity for the cathode is about 101 mAh/g. For cycle 3 the discharge specific capacity for the cathode is about 97 mAh/g. This represents a capacity fade of about 4% over 3 cycles. The cathode material under test demonstrates reasonable capacity retention behaviour.

Example 11:
P2-Na$_{0.67}$Ni$_{0.240}$Mn$_{0.533}$Mg$_{0.043}$Ti$_{0.083}$Al$_{0.1}$O$_2$ FIG. 11(A) shows the X-ray diffraction pattern of Na$_{0.67}$Ni$_{0.240}$Mn$_{0.533}$Mg$_{0.043}$Ti$_{0.083}$Al$_{0.1}$O$_2$ (sample number X1927). The pattern shows that the sample conforms to a layered P2-type structure.
Referring to FIG. 11(B)-(C).

The data shown in FIG. 11(B)-(C) are derived from the constant current cycling data for a P2-Na$_{0.67}$Ni$_{0.240}$Mn$_{0.533}$Mg$_{0.043}$Ti$_{0.83}$Al$_{0.1}$O$_2$ cathode active material in a Na-ion cell (Cell#410007) where this cathode material was coupled with a Hard Carbon (Carbotron P(J)) anode material. The electrolyte used was a 0.5 M solution of NaPF$_6$ in ethylene carbonate/diethyl carbonate/propylene carbonate. The constant current data were collected at an approximate current density of 0.2 mA/cm$^2$ between voltage limits of 1.00 and 4.30 V. To ensure that the Na-ion cell was fully charged, the cell was potentiostatically held at 4.3 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 11(B) shows the cell voltage profile (i.e. Na-ion Cell Voltage [V] versus Cumulative Cathode Specific Capacity [mAh/g]) for the first 4 charge/discharge cycles of the Hard Carbon//P2-Na$_{0.67}$Ni$_{0.240}$Mn$_{0.533}$Mg$_{0.043}$Ti$_{0.083}$Al$_{0.1}$O$_2$ cell. These data demonstrate that the level of voltage hysteresis (i.e. the voltage difference between the charge and discharge processes) is small indicating the excellent kinetic reversibility of the Na-ion extraction-insertion reactions in this cathode material.

FIG. 11(C) shows the constant current cycle life profile, i.e. the relationship between Cathode Specific Capacity for Discharge [mAh/g] and cycle number for the Hard Carbon//P2-Na$_{0.67}$Ni$_{0.240}$Mn$_{0.533}$Mg$_{0.043}$Ti$_{0.083}$Al$_{0.1}$O$_2$ cell. For cycle 1 the discharge specific capacity for the cathode is about 101 mAh/g. For cycle 3 the discharge specific capacity for the cathode is about 97 mAh/g. This represents a capacity fade of about 4% over 3 cycles. The cathode material under test demonstrates reasonable capacity retention behaviour.

The invention claimed is:
1. A doped nickelate material with the general formula:

$$A_aM^1_vM^2_wM^3_xM^4_yM^5_zO_{2-\delta}$$

wherein
A comprises one or more alkali metals selected from sodium, lithium and potassium;
M$^1$ is nickel in oxidation state 2+,
M$^2$ comprises one or more metals in oxidation state 4+,
M$^3$ comprises one or more metals in oxidation state 2+,
M$^4$ comprises one or more metals in oxidation state 4+, and
M$^5$ comprises one or more metals in oxidation state 3+
wherein
$0.4 \leq a < 0.9$,
$0 < v < 0.5$,
at least one of w and y is $>0$,
$x > 0$,
$z \geq 0$,
$0 \leq \delta \leq 0.1$,
and wherein a, v, w, x, y and z are chosen to maintain electroneutrality.

2. A doped nickelate material according to claim 1 wherein M$^2$ comprises one or more metals selected from manganese, titanium and zirconium; M$^3$ comprises one or more metals selected from magnesium, calcium, copper, zinc and cobalt; M$^4$ comprises one or more metals selected from manganese, titanium and zirconium; and M$^5$ comprises one or more metals selected from aluminium, iron, cobalt, molybdenum, chromium, vanadium, scandium and yttrium.

3. A doped nickelate material according to claim 1 selected from one or more of
Na$_{0.67}$Ni$_{0.300}$Mn$_{0.600}$Mg$_{0.033}$Ti$_{0.067}$O$_2$,
Na$_{0.67}$Ni$_{0.267}$Mn$_{0.533}$Mg$_{0.067}$Ti$_{0.133}$O$_2$,
Na$_{0.67}$Ni$_{0.283}$Mn$_{0.567}$Mg$_{0.05}$Ti$_{0.1}$O$_2$,
Na$_{0.67}$Ni$_{0.25}$Mn$_{0.667}$Mg$_{0.083}$O$_2$,
Na$_{0.7}$Ni$_{0.240}$Mn$_{0.533}$Mg$_{0.110}$Ti$_{0.117}$O$_2$,
Na$_{0.6}$Ni$_{0.240}$Mn$_{0.533}$Mg$_{0.060}$Ti$_{0.167}$O$_2$,
Na$_{0.67}$Ni$_{0.240}$Mn$_{0.533}$Mg$_{0.093}$Ti$_{0.133}$O$_2$,
Na$_{0.55}$Ni$_{0.240}$Mn$_{0.533}$Mg$_{0.035}$Ti$_{0.192}$O$_2$,
Na$_{0.67}$Ni$_{0.240}$Mn$_{0.533}$Mg$_{0.043}$Ti$_{0.083}$Fe$_{0.100}$O$_2$ and Na$_{0.67}$Ni$_{0.240}$Mn$_{0.533}$Mg$_{0.043}$Ti$_{0.083}$Al$_{0.100}$O$_2$.

4. A doped nickelate material according to claim 1 comprising a layered P2-type structure.

5. A process for preparing a doped nickelate material according to claim 1 comprising the steps: a) mixing together one or more precursor materials that comprise one or more metals selected from A, M$^1$, M$^2$, M$^3$, M$^4$ and M$^5$, in a stoichiometric ratio that corresponds with the amount of the respective one or more metals A, M$^1$, M$^2$, M$^3$, M$^4$ and M$^5$ present in the doped nickelate material; and b) heating the resulting mixture in a furnace at a single temperature or over a range of temperatures between 400° C. and 1500° C. until reaction product forms.

6. Use of one or more doped nickelate materials according to claim 1 in an application device selected from an energy storage device, a battery, a rechargeable battery, an electrochemical device, an electrochromic device and a Na-ion cell.

7. A battery comprising one or more doped nickelate materials according to claim 1.

8. An electrode comprising one or more doped nickelate materials according to claim 1.

9. A positive electrode comprising one or more doped nickelate materials according to claim 1.

10. A process for storing electrical charge comprising the use of a device comprising one or more doped nickelate materials according to claim 1.

* * * * *